US012699733B2

(12) United States Patent　　　　　(10) Patent No.:　US 12,699,733 B2
Gupte et al.　　　　　　　　　　　　(45) Date of Patent:　　　　Aug. 4, 2026

(54) GRAPH-BASED LABELING OF HETEROGENOUS DIGITAL CONTENT ITEMS

(71) Applicant: Microsoft Technology Licensing, LLC, Redmond, WA (US)

(72) Inventors: Pratik Vinay Gupte, Bangalore (IN); Nagaraj Kota, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1270 days.

(21) Appl. No.: 17/494,628

(22) Filed: Oct. 5, 2021

(65) Prior Publication Data

US 2023/0106416 A1　　Apr. 6, 2023

(51) Int. Cl.
| | |
|---|---|
| *G06F 16/00* | (2019.01) |
| *G06F 16/28* | (2019.01) |
| *G06F 16/901* | (2019.01) |
| *G06F 18/2137* | (2023.01) |
| *G06F 18/214* | (2023.01) |
| *G06N 3/02* | (2006.01) |
| *H04L 9/40* | (2022.01) |
| *H04L 51/212* | (2022.01) |

(52) U.S. Cl.
CPC ........ *G06F 16/9024* (2019.01); *G06F 16/288* (2019.01); *G06F 18/21375* (2023.01); *G06F 18/214* (2023.01); *G06N 3/02* (2013.01); *H04L 51/212* (2022.05); *H04L 63/20* (2013.01)

(58) Field of Classification Search
None
See application file for complete search history.

(56) References Cited

U.S. PATENT DOCUMENTS

| | | | |
|---|---|---|---|
| 7,953,763 B2 * | 5/2011 | Kamvar | ............... G06F 16/951 |
| | | | 707/812 |
| 8,472,728 B1 * | 6/2013 | Chau | ................... G06F 18/2433 |
| | | | 382/226 |

(Continued)

OTHER PUBLICATIONS

Saeedreza Shehnepoor, Mostafa Salehi, Reza Farahbakhsh, and Noel Crespi "NetSpam: A Network-Based Spam Detection Framework for Reviews in Online Social Media", Jul. 2017, IEEE Transactions on Information Forensics and Security, vol. 12, No. 7 (Year: 2017).*

(Continued)

*Primary Examiner* — Polina G Peach
(74) *Attorney, Agent, or Firm* — Nicholson De Vos Webster & Elliott LLP

(57)　　　　　ABSTRACT

Technologies for graph-based labeling of digital content items include, in some embodiments, for digital content items received from user systems by an application system, generating and storing a content graph. The content graph can include labeled nodes that correspond to digital content items that have labels, unlabeled nodes that correspond to digital content items that do not have labels, and edges that indicate relationships between content items. Edge data for an edge between an unlabeled node and an adjacent node can be retrieved from the content graph. Responsive to a set of inputs that includes the retrieved edge data and embedding data associated with the unlabeled node, a machine learning model trained on labeled nodes and edges of the content graph can assign a label to the unlabeled node.

20 Claims, 9 Drawing Sheets

(56) References Cited

U.S. PATENT DOCUMENTS

| | | | | |
|---|---|---|---|---|
| 10,430,464 | B1 * | 10/2019 | Ravi | G06F 16/9024 |
| 11,232,369 | B1 * | 1/2022 | Li | G06Q 50/01 |
| 11,587,139 | B2 * | 2/2023 | Mane | G06N 3/048 |
| 12,299,055 | B2 * | 5/2025 | Aggarwal | G06V 10/426 |
| 2008/0222135 | A1 * | 9/2008 | Chayes | G06F 16/951 |
| | | | | 707/999.005 |
| 2008/0275833 | A1 * | 11/2008 | Zhou | G06N 20/00 |
| | | | | 706/45 |
| 2009/0222435 | A1 * | 9/2009 | Andersen | G06F 16/951 |
| | | | | 707/999.005 |
| 2011/0103682 | A1 * | 5/2011 | Chidlovskii | H04L 51/52 |
| | | | | 382/190 |
| 2012/0246720 | A1 * | 9/2012 | Xie | H04L 51/212 |
| | | | | 726/22 |
| 2014/0040170 | A1 * | 2/2014 | Zheng | H04L 63/1408 |
| | | | | 706/12 |
| 2015/0058396 | A1 | 2/2015 | Frumin | |
| 2016/0357872 | A1 | 12/2016 | Fader | |
| 2017/0139921 | A1 * | 5/2017 | Ball | G06F 16/24578 |
| 2017/0221111 | A1 * | 8/2017 | Salehi | G06Q 30/0185 |
| 2018/0211177 | A1 | 7/2018 | Corbin et al. | |
| 2018/0336457 | A1 * | 11/2018 | Pal | G06N 3/08 |
| 2020/0160215 | A1 * | 5/2020 | Kotnis | G06F 7/544 |
| 2021/0110197 | A1 | 4/2021 | Zamora | |
| 2021/0406601 | A1 * | 12/2021 | Narlikar | G06F 18/213 |
| 2022/0101087 | A1 * | 3/2022 | Lee | G06F 18/10 |
| 2022/0269939 | A1 * | 8/2022 | Zhao | G06N 5/025 |
| 2023/0067528 | A1 * | 3/2023 | Guo | G06N 3/0895 |
| 2023/0089481 | A1 * | 3/2023 | Liu | G06N 3/0455 |
| | | | | 706/15 |

OTHER PUBLICATIONS

Zhao et al. "An Attention-Based Graph Neural Network for Spam Bot Detection in Social Networks", 2020, www.mdpi.com/journal/applsci (Year: 2020).*

Ao Li et al."Spam Review Detection with Graph Convolutional Networks", 2019 CIKM'19, ACM Association for Computing Machinery. (Year: 2019).*

"European Search Report Issued in European Patent Application No. 22200638.9", Mailed Date: Feb. 13, 2023, 9 Pages.

Arevalo, et al., "Gated Multimodal Units for Information Fusion", In Repository of arXiv:1702.01992v1, Feb. 7, 2017, pp. 1-17.

Armitage, et al., "Training Multimodal Systems for Classification with Multiple Objectives", In Repository of arXiv preprint arXiv:2008. 11450, Aug. 26, 2020, pp. 1-15.

Clark, et al., "More Efficient NLP Model Pre-training with Electra", Retrieved from: https://ai.googleblog.com/2020/03/more-efficient-nlp-model-pre-training.html, Mar. 10, 2020, 4 Pages.

Kiela, et al., "Efficient Large-Scale Multi-Modal Classification", In Repository of arXiv:1802.02892v1, Feb. 6, 2018, 7 Pages.

Lin, et al., "Focal Loss for Dense Object Detection", In Repository of arXiv:1708.02002v2, Feb. 7, 2018, pp. 1-10.

Owens, et al., "Audio-Visual Scene Analysis with Self-Supervised Multisensory Features", In the Repository of arXiv:1804.03641, Oct. 9, 2018, 19 Pages.

Roset, Corby, "Turing-NLG: A 17-Billion-Parameter Language Model by Microsoft", Retrieved From https://www.microsoft.com/en-us/research/blog/turing-nlg-a-17-billion-parameter-language-model-by-microsoft/, Feb. 13, 2020, 12 Pages.

Shi, et al., "Masked Label Prediction: Unified Message Passing Model for Semi-Supervised Classification", In Repository of arXiv:2009. 03509v5, May 10, 2021, 7 Pages.

Wang, et al., "What Makes Training Multi-modal Classification Networks Hard?", In Repository of arXiv:1905.12681v5, Apr. 3, 2020, 16 Pages.

Yun, et al., "Graph Transformer Networks", In Proceedings of 33rd Conference on Neural Information Processing Systems, Dec. 8, 2019, pp. 1-11.

Communication pursuant to Rules 70(2) and 70a(2) Received for European Application No. 22200638.9, mailed on Apr. 17, 2023, 02 pages.

Communication pursuant to Article 94(3), received in European Application No. 22200638.9, mailed on Nov. 29, 2023, 8 pages.

Notice of First Examination Opinion Received for Chinese Application No. 202211209381.5, mailed on Dec. 24, 2025, 35 Pages.

* cited by examiner

FIG. 3

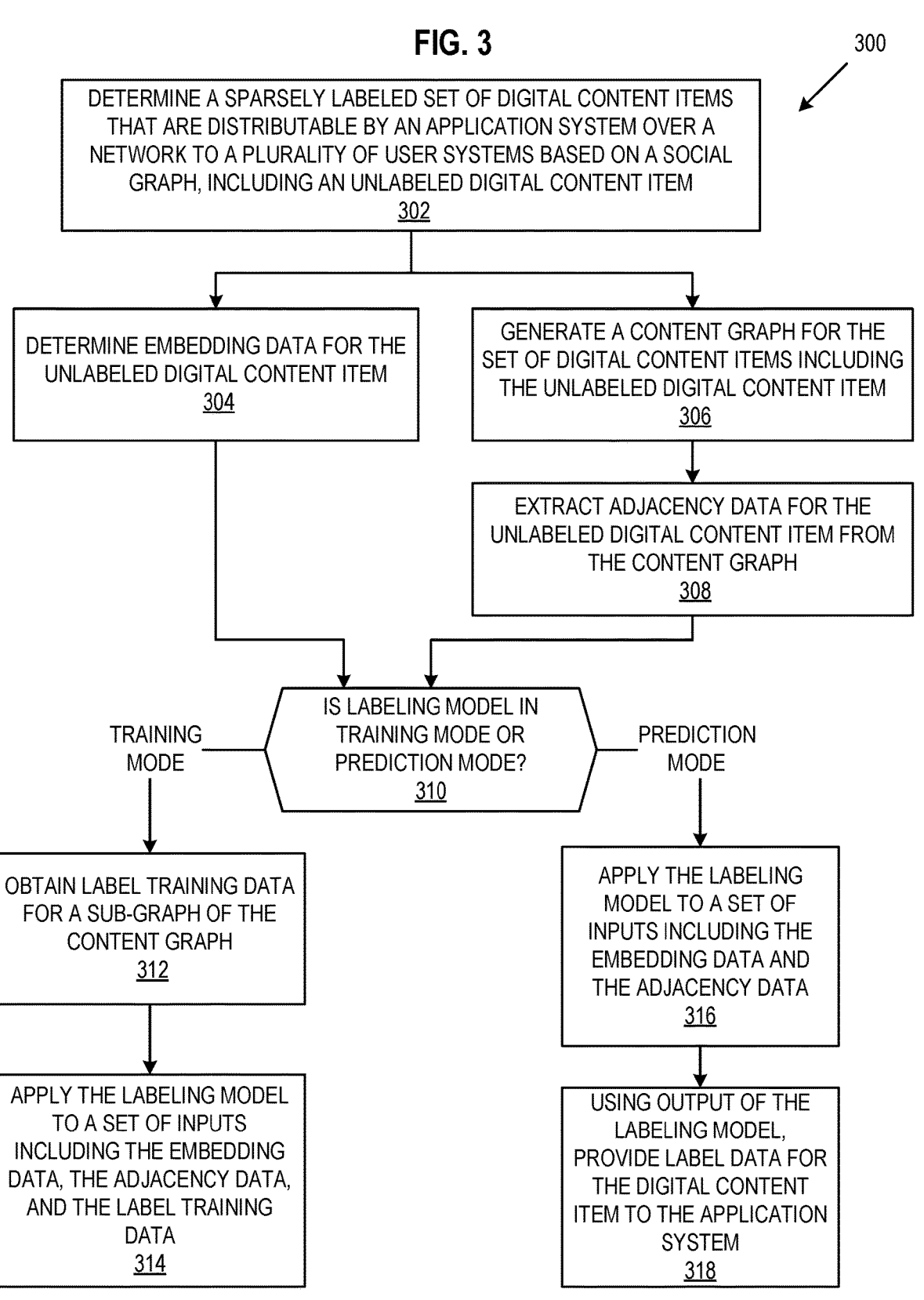

300

DETERMINE A SPARSELY LABELED SET OF DIGITAL CONTENT ITEMS THAT ARE DISTRIBUTABLE BY AN APPLICATION SYSTEM OVER A NETWORK TO A PLURALITY OF USER SYSTEMS BASED ON A SOCIAL GRAPH, INCLUDING AN UNLABELED DIGITAL CONTENT ITEM
302

DETERMINE EMBEDDING DATA FOR THE UNLABELED DIGITAL CONTENT ITEM
304

GENERATE A CONTENT GRAPH FOR THE SET OF DIGITAL CONTENT ITEMS INCLUDING THE UNLABELED DIGITAL CONTENT ITEM
306

EXTRACT ADJACENCY DATA FOR THE UNLABELED DIGITAL CONTENT ITEM FROM THE CONTENT GRAPH
308

IS LABELING MODEL IN TRAINING MODE OR PREDICTION MODE?
310

TRAINING MODE

PREDICTION MODE

OBTAIN LABEL TRAINING DATA FOR A SUB-GRAPH OF THE CONTENT GRAPH
312

APPLY THE LABELING MODEL TO A SET OF INPUTS INCLUDING THE EMBEDDING DATA AND THE ADJACENCY DATA
316

APPLY THE LABELING MODEL TO A SET OF INPUTS INCLUDING THE EMBEDDING DATA, THE ADJACENCY DATA, AND THE LABEL TRAINING DATA
314

USING OUTPUT OF THE LABELING MODEL, PROVIDE LABEL DATA FOR THE DIGITAL CONTENT ITEM TO THE APPLICATION SYSTEM
318

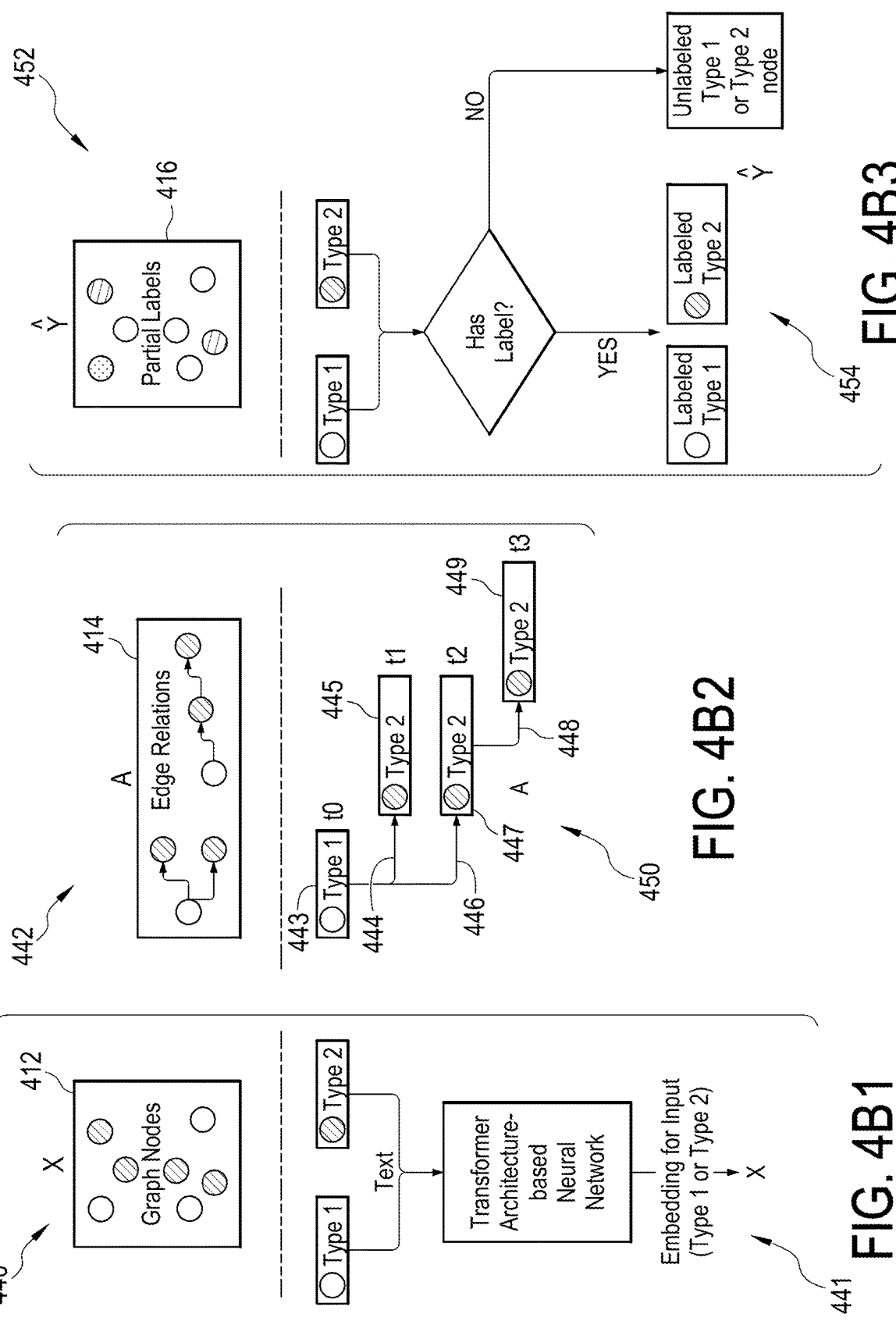
FIG. 4B3
FIG. 4B2
FIG. 4B1

500

GRAPH-BASED LABELING OF HETEROGENOUS DIGITAL CONTENT ITEMS

TECHNICAL FIELD

The present disclosure generally relates to labeling of digital content items using machine learning models, and more specifically relates to graph-based labeling of heterogenous digital content items using machine learning models to detect spam and/or content moderation policy triggers.

BACKGROUND

Network-based application systems can distribute digital content items to large numbers of users on a network. Often, the digital content items distributed by an application system are generated by users of the system. An application system can use algorithms to determine the extent to which it distributes, or constrains the distribution of, digital content items to users of the application system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method to label a digital content item in accordance with some embodiments of the present disclosure.

FIG. 4B1, FIG. 4B2, and FIG. 4B3 illustrate inputs for a machine learning model architecture to label digital content items in accordance with some embodiments of the present disclosure.

DETAILED DESCRIPTION

Figure 1:
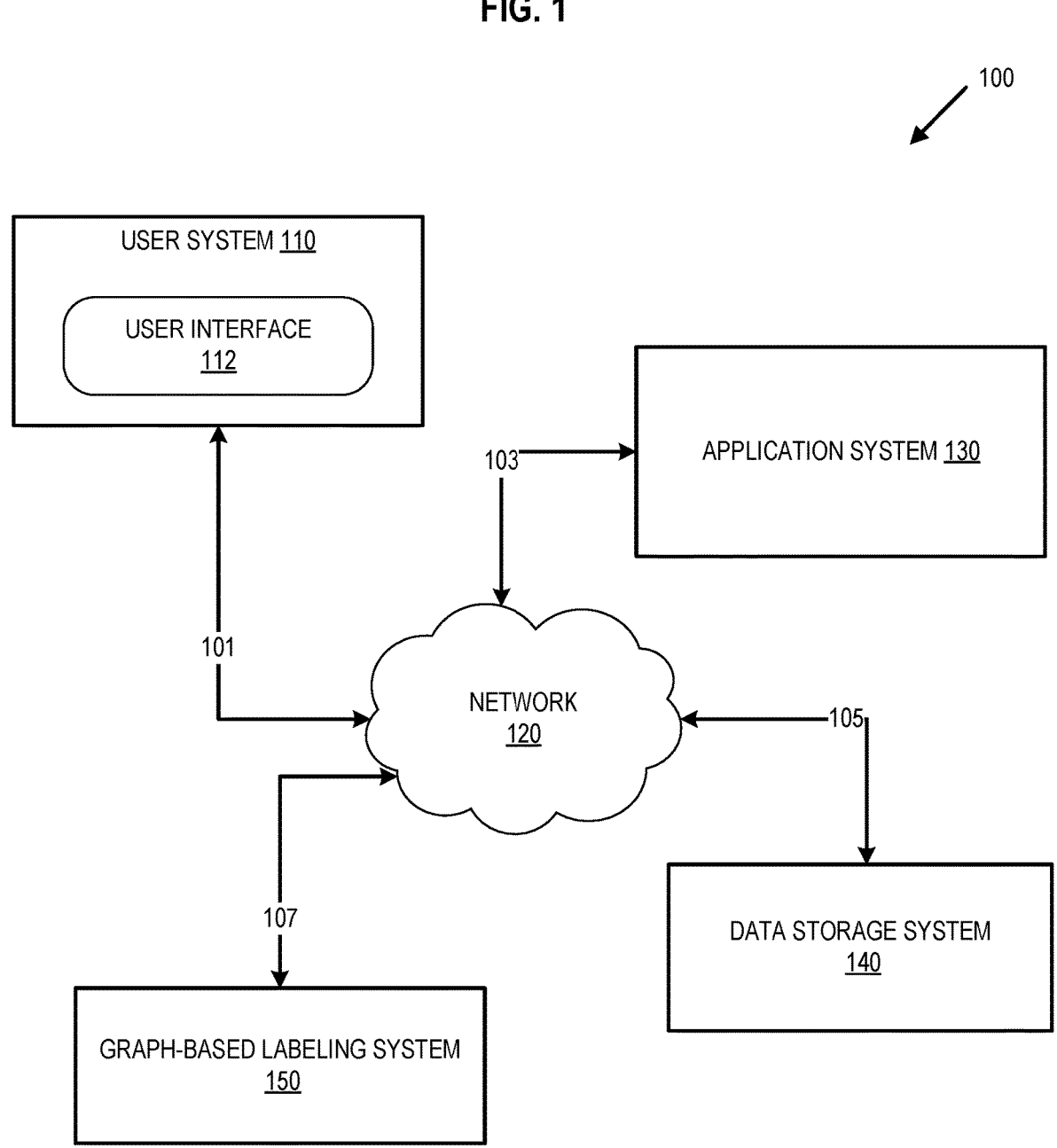
FIG. 1 illustrates an example computing system that includes a graph-based labeling system in accordance with some embodiments of the present disclosure.

Not every digital content item received by an application system is to be, or should be, distributed, to all users of the system. Distribution of digital content items can be algorithmically controlled by an application system according to various criteria; for example, rules, policies, and user preferences. In some application systems, the users' ability to generate distributable digital content is largely unconstrained. The continuing expansion of smartphone use worldwide has led to explosive growth in the production of user-generated content in many different languages.

The availability of high-speed internet technologies has facilitated the creation and network-based distribution of extremely large quantities of multimedia content including digital music, videos, live streaming videos and live podcasts. One report concluded that as of 2021 there were 4.2 billion active social media users worldwide—over half the world's population. Another report concluded that online media usage, including message sharing, voice and video calls, multimedia downloads, photo uploads, job applications, and digital payment transactions, was up to nearly 50 million pieces of digital content items per Internet minute as of August 2020.

User-generated digital content items can be considered unstructured data in the sense that such digital content items often lack metadata, such as semantic labels, which an application system otherwise could use to algorithmically control the online distribution of the digital content items. In particular, users often desire their content items to "go viral" on the network and as such, do not label their content as spam or unwanted content. In fact, some users can attempt to disguise the true nature of their content items to avoid detection by spam filters and content moderation policies. When metadata is not available for a digital content item, the application system needs to analyze the available characteristics of the digital content item and create or assign metadata based on the available characteristics.

Using, for example, a rules engine, an application system can compare content item labels to content distribution policies, such as spam policies and content moderation policies. In some contexts, terminology such as content distribution policy, content moderation policy, spam filter, and spam policy may be used interchangeably. Based on the results of these comparisons, an application system can constrain distribution of digital content items that are labeled as different types of spam, e.g., inflammatory, financial fraud, adult content, hate speech, not suitable for work, etc., in different ways. On the other hand, an application system can facilitate distribution of digital content items that are labeled, e.g., high quality, educational, personal health, etc., in different ways as well.

As used herein, spam can refer to any category of unwanted digital content, including but not limited to categories of digital content items that trigger content moderation policies. Categories of spam can include negative labels such as inflammatory, financial fraud, adult content, hate speech, and not suitable for work. Spam categories can also include positive labels such as high quality, education, health, personal, private, etc. The applicable spam categories can vary and depend on the particular application and/or use case at hand.

Many application systems deal with a wide variety of content types, modalities, languages, and content distribution policies. The terms content type and modality are used herein to refer to different attributes of content items, which a system can use to categorize or classify digital content items. Although in some use cases the terms modality and content type may be used interchangeably, definitions are provided for ease of discussion with respect to this disclosure.

As used herein, content type can refer to the means by which a digital content item came into existence in an application system. For example, content type can correspond to the action taken by a user of an application system to publish or otherwise introduce a digital content item to the application system. Examples of content types include post, comment, reply, and article. A digital content item's content type can be a signal of a dependency with another digital content item in the application system. For example, a content item of the type "comment" has a dependency relationship with at least one other content item.

An example of a dependency relationship is a temporal dependency. Temporal dependencies can be determined at least in part by timestamps associated with content items. A timestamp is system-generated digital data that indicates a particular date and time in accordance with a system clock. For example, a timestamp can indicate the date and time at which an article is uploaded to an application system or the date and time at which a post, comment, or reply is created in the application system. Timestamps can indicate temporal dependencies in that a comment on an article will have a timestamp that is after (later than) the timestamp of the article and a reply to a comment will have a timestamp that is after (later than) the timestamp of the comment. A content item can have dependency relationships with multiple different other content items. For example, a comment on an article can also be a reply to another comment on the same article.

Additionally or alternatively, different digital content items can have different types of non-temporal relationships with other digital content items in an application systems, including various types of semantic relationships and social graph-based relationships. Examples of semantic relationships include content items that have been assigned a same semantic label, content items that have been determined to be related to a same topic, and content items of the same modality.

Examples of social graph-based relationships include content items that have been posted or shared by the same users of the application system or content items that have been interacted with by n-degree connections of particular users who have posted or shared the content items, where n is a positive integer. Information about the relationships between digital content items in an application system can be stored in fields or columns of a database and/or can be indicated by keys that are associated with digital content item data records. In a graph database, a digital content item can be represented as a node and inter-content item relationships can be stored as edges.

As used herein, modality can refer to a particular digital form of a content item. Examples of modality include text, long text, short text, image, artwork, video (recorded or live streaming), audio (recorded or live streaming), multimedia, hashtag, emoji, animated gif, and OCR (optical character recognition) text. The language in which a content item is written or spoken can also be stored as a modality. Thus, a digital content item can have more than one modality. For example, a post can include short text, an image, OCR text extracted from the image, a language associated with the short text, and a language associated with the OCR text.

Content type and modality information about a digital content item can be stored as attribute data associated with a content item. For example, content type and modality can be stored in one or more fields or columns of a database. In a graph database, a digital content item can be represented as a node and content type and modality information can be stored at the node.

Existing systems have used binary classifiers to generate semantic labels, such as spam labels, for digital content items with limited success. A semantic label predicted by a binary classifier can be used to predict the probability of a digital content item triggering a content distribution policy if the problem domain is narrowly defined. For example, a binary classifier might be able to predict the likelihood that a particular article written in the English language is to be labeled inflammatory if the classifier has been trained on inflammatory articles written in the English language but not if the classifier has been trained on financial fraud articles written in Italian.

More generally, a binary classifier can predict the probability that an input of a particular content type and/or modality X (e.g., text comment, photo post, text article, image comment, etc.) in a particular language Y (e.g., English, French, Mandarin, German) is to be assigned a semantic label that triggers a particular policy Z. For example, a semantic label can trigger a content distribution policy that causes the application system to distribute content items with the semantic label differently than other content items that are not labeled the same way, whether to facilitate or constrain distribution.

Due to the nature of binary classifiers, the total number of binary classifiers needed for an application system to handle all possible combinations of content item types, modalities, languages, and policies seen by the application system can scale up very quickly, requiring up to $X*Y*Z$ binary classifiers to be trained and maintained.

Maintaining this many classifiers involves significant human hours for development and maintenance. Binary classifiers require a significant number of human labeled training examples in order to generate reliable predictions. Thus, a great many human hours are needed for data labeling and label review. The need to support multiple different languages additionally requires human resources well-versed in those languages.

Additionally, the review criteria, e.g., policies, used by an application system to control or moderate distribution of digital content items, are not static. With binary classifiers, frequent policy changes render historically labeled datasets unsuitable for ongoing training iterations, leading to a shortage in training data when the binary classifiers need to be trained for newer policies or for policy changes.

Application systems that provide asynchronous commentary/conversation capabilities in connection with the distribution of digital content items can enable users to add comments, reviews, and replies to earlier comments on a post. However, the known binary classifiers classify individual content items in isolation; that is, an article and a comment on the article are classified independently of each other by the same binary classifiers or by different binary classifiers. Thus, binary classifiers can easily mis-classify comments and other content items that have dependencies to other content items, because binary classifiers lack access to the context provided by the article post and/or other comments in the thread.

For example, a comment such as "let's take a road trip" might be inaccurately labeled "clear" by a binary classifier trained on inflammatory text even though the binary classifier has already labeled the original post, "What do you think about allowing drivers to run over a mob?" as inflammatory. This type of error can occur because when reviewed in isolation, "let's take a road trip" does not contain any inflammatory words or phrases. As another example, different portions of a multi-modal content item can be classified by different binary classifiers trained to handle the different individual modalities, leading to sub-optimal, inconclusive, or inaccurate labels.

Accordingly, when used for spam detection and/or content moderation, binary classifiers can suffer from poor recall, particularly in asynchronous commentary/conversation scenarios as well as multi-modal, multi-lingual, and multi-task scenarios.

As a result of the above-described technical challenges and shortcomings of existing systems, and other ongoing developments, application systems that distribute large quantities of user-generated content to large numbers of users need a scalable way to reliably generate metadata that the application systems can use to determine whether user-generated digital content items trigger spam filters, content moderation policies, or other applicable content distribution criteria.

As the volume of user-generated content on a network continues to grow and expand into different types of digital media and different languages, the criteria for distributing digital content items on the network also continues to change and evolve. Application systems need digital content item labeling technologies that are adaptable to new types of content items, new content modalities, and content distribution criteria that change over time.

Aspects of the present disclosure provide a digital content labeling system that addresses the above and other deficiencies. For example, aspects of this disclosure use a machine learning model to model digital content items and relationships between digital content items as a multi-content type, multi-modal, multi-lingual, multi-task content graph, thereby enabling many different types of content types, use cases, and inter-content item relationships to be reflected in the content graph, the labeling model trained on the content graph, and the content labels produced by the labeling model.

Multi-content type as used herein indicates that the model architecture of the disclosed digital content labeling system can include a single, integrated machine learning-based labeling model that can take as input digital content items having many different content types, and can assign labels to content items of multiple different content types. This is in contrast to prior systems, which require multiple different binary classifiers that are separately trained for different content types rather than a single, integrated model that can handle many different combinations of content types.

Multi-modal indicates that the model architecture of the disclosed digital content labeling system can include a single, integrated labeling model that can assign labels to content items of multiple different modalities. This is in contrast to prior systems, which require different binary classifiers that are separately trained for different modalities.

Multi-lingual indicates that the machine learning model architecture of the disclosed digital content labeling system can include a single, integrated labeling model that can assign labels to content items having text written in multiple different languages. This is in contrast to prior systems, which require different binary classifiers that are separately trained for different languages.

Multi-task indicates that the machine learning model architecture of the disclosed digital content labeling system can include a single labeling model that can assign labels to content items for different spam detection and/or content moderation tasks. Task as used herein can refer to the system-controlled application of a policy to a content item. An example of a task is a system process that determines whether a content item triggers a particular policy, such as a spam policy or a content moderation policy, even if the policy was originally implemented for a different content type, modality, language, or combination of content type, modality, and/or language. This is in contrast to prior systems, which require different binary classifiers that are separately trained for different spam detection and content moderation tasks.

Broadly speaking, aspects of this disclosure include a graph-based labeling model that is able to label digital content items across content types, modalities, languages, and tasks/policies. In doing so, aspects of this disclosure provide a graph-based model architecture that can generate multiple different types of label predictions for unlabeled content items of multiple different types, modalities, and languages. Embodiments of the graph-based model are responsive to inputs that have been extracted from a content graph in which nodes of the content graph correspond to digital content items in an application system. These inputs can include node attribute data, which reflect characteristics of a corresponding digital content item such as modality, content type, language, and pre-existing semantic labels (if any), and edge data, which reflect relationships between digital content items represented by the nodes in the content graph.

Aspects of the disclosed graph-based model architecture can propagate label predictions across edge-related heterogenous content types, modalities, and languages, thereby avoiding the need for separate classifiers for every combination of content type, modality, language, and task/policy. Additionally, aspects of the disclosed graph-based approaches require far fewer labels for classifier training, which reduces the training and maintenance burden. Further, aspects of the disclosed technologies enable digital content item labeling systems to improve recall and adapt to new content types, modalities, languages, and policies, and to handle policy changes, even if only a small number of training samples are available.

FIG. 1 illustrates an example computing system 100 that includes a graph-based labeling system 150. In the embodiment of FIG. 1, computing system 100 includes a user system 110, a network 120, an application system 130, a data storage system 140, and graph-based labeling system 150.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application system 130, which may be implemented as a native application on a computing device or as a web application that launches in a web browser.

User interface 112 is any type of user interface as described above. User interface 112 can be used to input, upload, or share digital content items and/or to view or otherwise perceive digital content items distributed by application system 130. For example, user interface 112 can include a graphical user interface, haptic interface, and/or a conversational voice/speech interface that includes one or more mechanisms for viewing and manipulating digital content items.

Figure 2A:
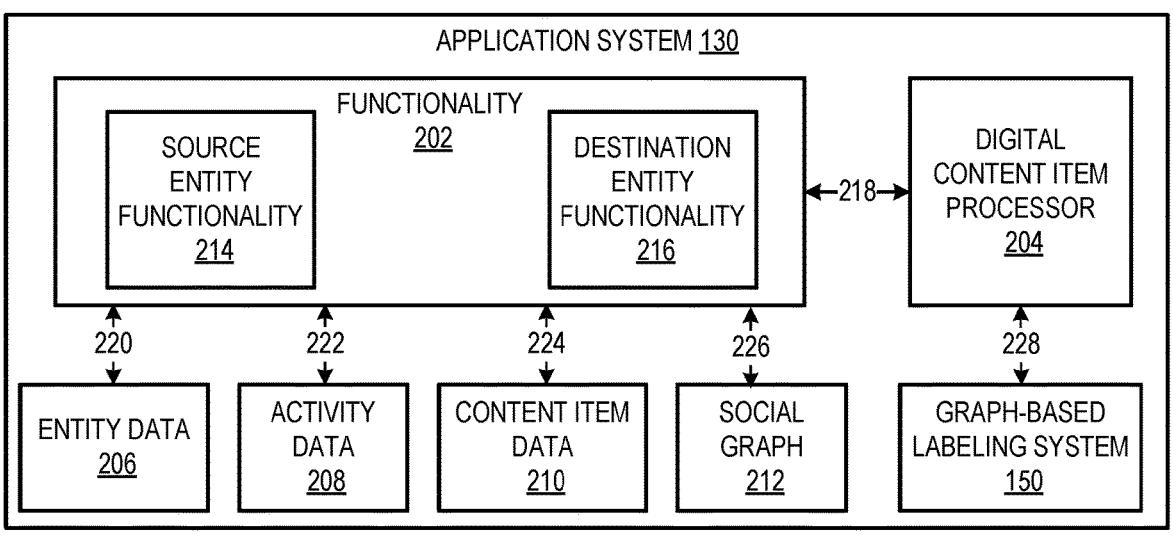
FIG. 2A is an example of an application system that includes the graph-based labeling system in accordance with some embodiments of the present disclosure.

Application system 130 is any type of application software system that includes or utilizes functionality provided by graph-based labeling system 150. Examples of application system 130 include but are not limited to connections network software, such as professional and/or general social media platforms, and systems that are or are not be based on connections network software, such as digital content distribution services, general-purpose search engines, job search software, recruiter search software, sales assistance software, advertising software, learning and education software, or any combination of any of the foregoing. An example embodiment of application system 130 is shown in FIG. 2A, described below.

Data storage system 140 includes data stores and/or data services that store digital content items, data received, used, manipulated, and produced by application system 130, and data received, used, manipulated, and produced by graph-based labeling system 150. Data storage system 140 can include a distributed data service. As used herein, data service may refer to a physical, geographic grouping of machines, a logical grouping of machines, or a single machine. For example, a data service may be a data center, a cluster, a group of clusters, or a machine.

Data stores of data storage system 140 can include one or more offline stores and/or one or more nearline stores. Data stores may be implemented using databases, such as key-value stores, relational databases, and/or graph databases. Nearline data stores can store real-time event streams such as KAFKA event streams. Data can be written to and read from data stores using query technologies, e.g., SQL or NoSQL.

Graph databases organize data using a graph data structure that includes a number of interconnected graph primitives. Examples of graph primitives include nodes, edges, and predicates, where a node stores data, an edge creates a relationship between two nodes, and a predicate is a semantic label assigned to an edge, which defines or describes the type of relationship that exists between the nodes connected by the edge.

A node of a graph database can correspond to a table, a subset of a table, or set of rows and columns of different tables of a non-graph database. Another example of a graph primitive is a particular portion of a graph or a sub-graph, such as a specific pair of nodes plus an edge by which the nodes are connected. A graph query language can be used to construct and execute queries on the graph database and to create, update, and manipulate components of a graph database. With a graph database, query results include a subset of the graph stored in the graph database. For example, graph nodes, edges, and edge labels (also called predicates) can be used to translate data records from a non-graph format to a graph.

Data stored in a non-graph database portion of data storage system 140 can be converted or translated into a graph format that can be stored in a graph database and queried using various types of graph queries, such as edge queries and path queries. An example of an edge query is a query to retrieve the number of first-degree connections of a node. An example of a path query is a query to determine how many edges exist between two nodes, e.g., how many degrees of connection separate two nodes. Graph queries can be implemented using a graph query language such as datalog.

To convert data stored in a non-graph data structure to a graph format, the graph database employs a set of graph primitives. Examples of graph primitives include rules that are based on edges in a graph, which express non-graph database schemas, and compound keys that specify relationships between nodes, edges and predicates in a graph that correspond to non-graph data structures. For example, the graph primitives can include a rule that expresses a relational schema in the non-graph data structure. A rule based on graph-based entity-to-entity relationships a-to-b and b-to-c may relate a, b, and c in the non-graph schema. As another example, a compound key can be used to express relationships between tables and attributes of a non-graph data structure, where the attributes correspond to predicates in the graph schema and the tables correspond to nodes in the graph schema.

Data storage system 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data storage system 140 can be part of computing system 100 or accessed by computing system 100 over a network, such as network 120.

Figure 6:
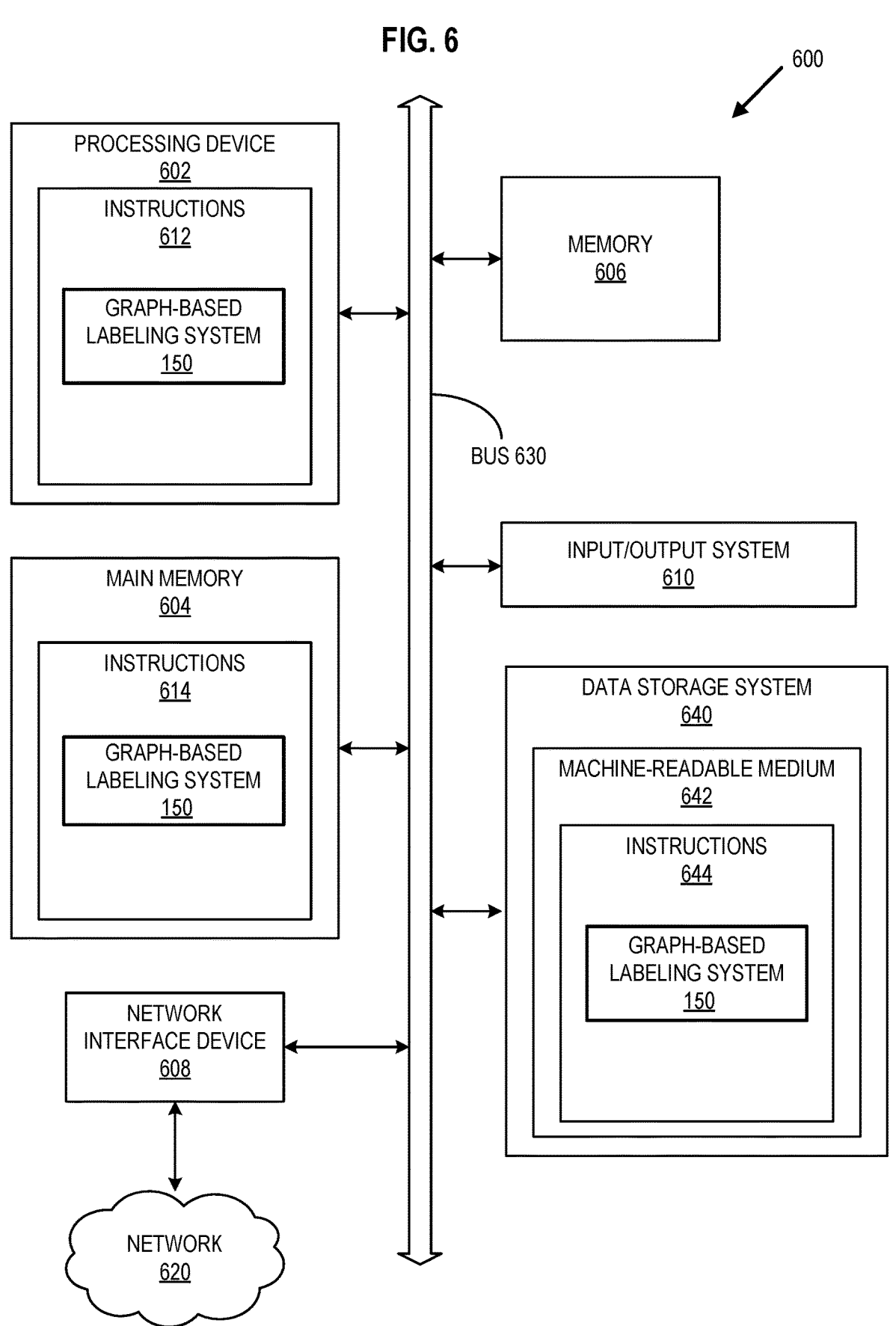
FIG. 6 is a block diagram of an example computer system in which embodiments of the present disclosure can operate.

Graph-based labeling system 150 can generate semantic labels, including spam labels, for unstructured data including but not limited to user-generated digital content items. In some embodiments, application system 130 includes at least a portion of graph-based labeling system 150. As shown in FIG. 6, graph-based labeling system 150 can be implemented as instructions stored in a memory, and a processing device 602 can be configured to execute the instructions stored in the memory to perform the operations described herein.

The disclosed technologies can be described with reference to an example use case of labeling user-generated digital content items for spam detection and/or content moderation policy violations. For example, the disclosed technologies can be used to automatically apply spam labels to digital content items that are input, uploaded, shared, and otherwise distributed on a social graph application such as a professional social network or other social media.

Aspects of the disclosed technologies are not limited to social graph applications but can be used to label unstructured digital content items more generally. The disclosed technologies can be used by many different types of network-based applications in which the proliferation of unstructured and/or unlabeled digital content items is desired to be monitored and/or moderated. Additional description of graph-based labeling system 150 is provided below, for example with reference to FIG. 2A and FIG. 2B.

Any of user system 110, application system 130, data storage system 140, and graph-based labeling system 150 includes an interface embodied as computer programming code stored in computer memory that when executed causes a computing device to enable bidirectional communication with any other of user system 110, application system 130, data storage system 140, and graph-based labeling system 150 using communicative coupling mechanisms 101, 103, 105, 107. Examples of communicative coupling mechanisms include network interfaces, inter-process communication (IPC) interfaces and application program interfaces (APIs).

A client portion of application system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application system 130 and/or a server portion of application system 130 can receive the input, perform at least one operation using the input, and return output using an HTTP response that the web browser receives and processes.

Other technologies can be used to effectuate communications of data and instructions between user system 110 and any of user system 110, application system 130, data storage system 140, and graph-based labeling system 150 include application programming interfaces (APIs) such as REST (representational state transfer) APIs and SOAP (simple object access protocol), scripting languages such as JavaScript, markup languages such as XML (extensible markup language) and JSON (JavaScript object notation), and AJAX (asynchronous JavaScript and XML).

Each of user system 110, application system 130, data storage system 140, and graph-based labeling system 150 is implemented using at least one computing device that is communicatively coupled to electronic communications network 120 using communicative coupling mechanisms 101, 103, 105, 107. Any of user system 110, application system 130, data storage system 140, and graph-based labeling system 150 can be bidirectionally communicatively coupled by network 120. User system 110 as well as one or more different user systems (not shown) can be bidirectionally communicatively coupled to application system 130.

A typical user of user system 110 can be an administrator or an end user of application system 130 and/or graph-based labeling system 150. An administrator or an end user can be a human person or a computer program designed to simulate human use of application system 130, such as a bot. User system 110 is configured to communicate bidirectionally with any of application system 130, data storage system 140, and/or graph-based labeling system 150 over network 120 using communicative coupling mechanisms 101. User system 110 has at least one address that identifies user system 110 to network 120 and/or application system 130; for example, an IP (internet protocol) address, a device identifier, a MAC (media access control) address, a session identifier, a user account identifier, or any combination of any of the foregoing.

The features and functionality of user system 110, application system 130, data storage system 140, and graph-based labeling system 150 are implemented using computer software, hardware, or software and hardware, and can include combinations of automated functionality, data structures, and digital data, which are represented schematically in the figures. User system 110, application system 130, data storage system 140, and graph-based labeling system 150 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. For example, data and instructions can be represented as signals, where a signal includes a series of bits, and a bit value corresponds to a designated level of electrical charge that can traverse network 120 and be received and processed by devices on network 120. Examples of network 120 include, without limitation, a Local Area Network (LAN), a Wide Area Network (WAN), an Ethernet network, the Internet, at least one terrestrial, satellite or wireless link, or a combination of any number of different networks and/or communication links.

FIG. 2A is an example embodiment of application system 130 that includes graph-based labeling system 150 in accordance with some embodiments of the present disclosure. In FIG. 2A, application system 130 includes functionality 202, digital content item processor 204, entity data 206, activity data 208, content item data 210, social graph 212, and graph-based labeling system 150.

Functionality 202 generally includes user-facing functionality and back-end functionality that enable data manipulations and communications between users of application system 130 and application system 130. An entity in application system 130 is a logical construct that is linked with an address of a physical user system 110. A user system 110 can be associated with more than one entity in application system 130. For example, a physical user system 110 can be associated with multiple different logical account identifiers. Examples of entity types include users, companies, organizations, jobs, and content items.

Data manipulations and communications performed by a user system 110 in application system 130 can be described with reference to an entity associated with the user system 110. User-facing functionality of application system 130 includes functionality that is exposed to users of application system 130 through a user interface. User-facing functionality includes source entity functionality 214 and destination entity functionality 216. Source entity can refer to an entity that generates or otherwise provides digital content items to application system 130. Thus, source entity functionality 214 can include, for example, user interface features and functions that enable users to view, create, upload, share, forward, reply to, and save digital content items in application system 130, to view, add, edit, and delete comments and replies to comments on digital content items, and/or to view, send and receive messages including digital content items.

Examples of digital content items include posts, comments, and replies to comments. Examples of posts include articles and/or links to articles such as URLs (Uniform Resource Locators). Posts can include text and/or multimedia content items such as images, video, and audio, whether previously recorded or streamed live. Commentary can refer to any type of content item that is linked with a post, such as comments and replies to comments. Commentary can include text and/or multimedia content items such as images, video, and audio, whether previously recorded or streamed live. Text can be of any length and can include metadata such as hashtags and URLs.

Destination entity can refer to an entity that is the recipient of a digital content item originally generated by a source entity in application system 130. Thus, destination entity functionality 216 can include, for example, user interface features and functions that enable users to view and manipulate digital content items received by the destination entity in a search result, a feed, a recommendation, a notification, or a message generated by application system 130. Destination entities can also be source entities. For example, a destination entity can share a digital content item with other entities after viewing the digital content item in the destination entity's feed. Source entities can also be destination entities. For example, a source entity can receive, e.g., by clicking on a push notification, a comment made by another entity on a post originally made by a source entity.

In application system 130, source entity functionality 214 and destination entity functionality 216 are enabled by internet communications technologies. For example, source entity functionality 214 that enables sharing of a digital content item in application system 130 includes the sending and receiving of network messages between the user system sharing the digital content item and application system 130. Destination entity functionality 216 that enables searching for, viewing and manipulation of a digital content item in application system 130 includes the sending and receiving of network messages between the user system viewing and/or manipulating the digital content item and application system 130. In some contexts, network messages can be referred to as requests. Also, source entity functionality 214 and destination entity functionality 216 can be asynchronous.

Back-end portions of functionality 202 include computer operations, such as data manipulations and communications, that support the front-end functionality. Back-end functionality can include reading data from a data store, such as entity data 206, activity data 208, content item data 210, and/or social graph 212, performing computations and/or transformations on data, and writing data and/or results of computations and/or transformations to a data store.

Back-end functionality can include computer execution of algorithms that determine the extent to which digital content items can proliferate within application system 130. Back-end functionality can include execution of queries against one or more data stores. For example, back-end functionality can include executing queries to determine the nth-degree connections of an entity in social graph 212, where n is a positive integer, and queries of one or more data stores to retrieve a search result. Back-end functionality can include execution of algorithms to select and retrieve digital content items to populate a search result, a feed, a notification, a message, a push notification, or a recommendation. Back-end functionality can include executing edge queries and/or path queries against a graph database. Back-end functionality can include translating or converting data stored in a non-graph data structure to a graph.

Algorithms executed as part of back-end functionality can include, e.g., rules engines, heuristics, and/or machine learning algorithms that have been trained using one or more data sets of training data. Back-end functionality can be executed by a server computer or network of servers and/or portions of back-end functionality can be implemented on a client device, e.g., a user system 110. Front-end functionality can be executed by a client device, e.g., a user system 110 and/or portions of front-end functionality can be implemented on a server computer or network of servers.

Entity data 206 is a data store of data storage system 140 that stores entity data records. An entity data record includes an entity identifier. An entity data record can include or reference entity type data and/or entity profile data. Entity type data indicates an entity type associated with an entity identifier, e.g., person, organization, job, or content. Entity profile data includes attribute data associated with an entity identifier, e.g., name, location, title. Entity data 206 can be stored in a non-graph database and also converted to a graph stored in a graph database. For example, portions of entity data, such as attribute data, can be stored in a table of a non-graph database and a node in a graph database.

Activity data 208 is a data store of data storage system 140 that stores activity data records. An activity data record includes an activity identifier, an entity identifier, and a date/timestamp. An activity data record can include or reference activity type data. Activity type data indicates an activity type associated with an entity identifier and a front-end functionality. Examples of activity type data include view, click, comment, share, like, follow. Activity data 208 can be captured and stored as a real-time or near real-time data stream, for example in a nearline portion of data storage system 140.

Content item data 210 is a data store of data storage system 140 that stores digital content item data records. A digital content item data record can include a content item identifier, an entity identifier, and a date/timestamp. A content item data record can include or reference content type data. Content type data indicates a content type and/or modality associated with a content item identifier. Examples of content type and/or modality data include text, video, image, audio, stream, article, commentary, metadata. Content item data 210 can include or reference a content item identifier of another digital content item in application system 130. Content item data 210 can include label data generated by graph-based labeling system 150.

Content item data 210 can be stored in a non-graph database portion of data storage system 140. Portions of content item data 210 can be converted to a graph and stored in a graph database portion of data storage system 140 using graph primitives. For example, portions of content item data, such as attribute data including content type data, modality data, language data, label data, and inter-content item relationship data, can be stored in tables of a non-graph database and/or nodes and edges of a graph database. Content graphs generated by graph-based labeling system 150 can be stored in a graph database portion of content item data 210.

Social graph 212 is a data store of data storage system 140 that stores graph-based representations of entities and inter-entity relationships. In social graph 212, entities are represented as nodes and inter-entity relationships are represented as edges. A node contains a node identifier and node type data. Node type data can correspond to an entity type. An edge contains node identifier data for two nodes connected by the edge and an edge type. Edge types correspond to different types of inter-entity relationships. Examples of inter-entity relationships include connection, like, follow, share, comment. An edge can connect two different node types. For example, an edge can represent a relationship between a person entity and a digital content item, or a person entity and an organization, or an organization and a job. Social graph 212 can include content graphs generated by graph-based labeling system 150.

Entity data 206, activity data 208, content item data 210, and social graph B12 are each in bidirectional digital communication with functionality 202 via communicative couplings 220, 222, 224, 226, 228, respectively.

Digital content item processor 204 is in bidirectional digital communication with functionality 202 via communicative coupling 218. Functionality 202 can issue calls or send data and/or instructions to digital content item processor 204 over communicative coupling 218. Digital content item processor 204 can issue calls or send data and/or instructions to functionality 202 via communicative coupling 218.

For example, functionality 202 can issue a call to digital content item processor 204 containing a digital content item identifier as an argument or parameter in response to functionality 202 receiving or processing the digital content item identified by the digital content item identifier in application system 130. In response to a call from functionality 202, digital content item processor 204 can return to functionality 202 a semantic label such as a spam label for the digital content item corresponding to the digital content item identifier contained in the call. Digital content item processor 204 can include other functionality as shown in FIG. 2B, described below.

Digital content item processor 204 is in bidirectional digital communication with graph-based labeling system 150 via communicative coupling 228. Digital content item processor 204 can issue calls or send data and/or instructions to graph-based labeling system 150 over communicative coupling 228. Graph-based labeling system 150 can issue calls or send data and/or instructions to digital content item processor 204 over communicative coupling 228. For example, to respond to a call from functionality 202, digital content item processor 204 can issue a call containing the digital content identifier as an argument or parameter to graph-based labeling system 150 over communicative coupling 228. In response to a call from digital content item processor 204, graph-based labeling system 150 can return to digital content item processor 204 the semantic label for the digital content item corresponding to the digital content item identifier contained in the call. Graph-based labeling system 150 can include functionality shown in FIG. 2B, described below.

Figure 2B:
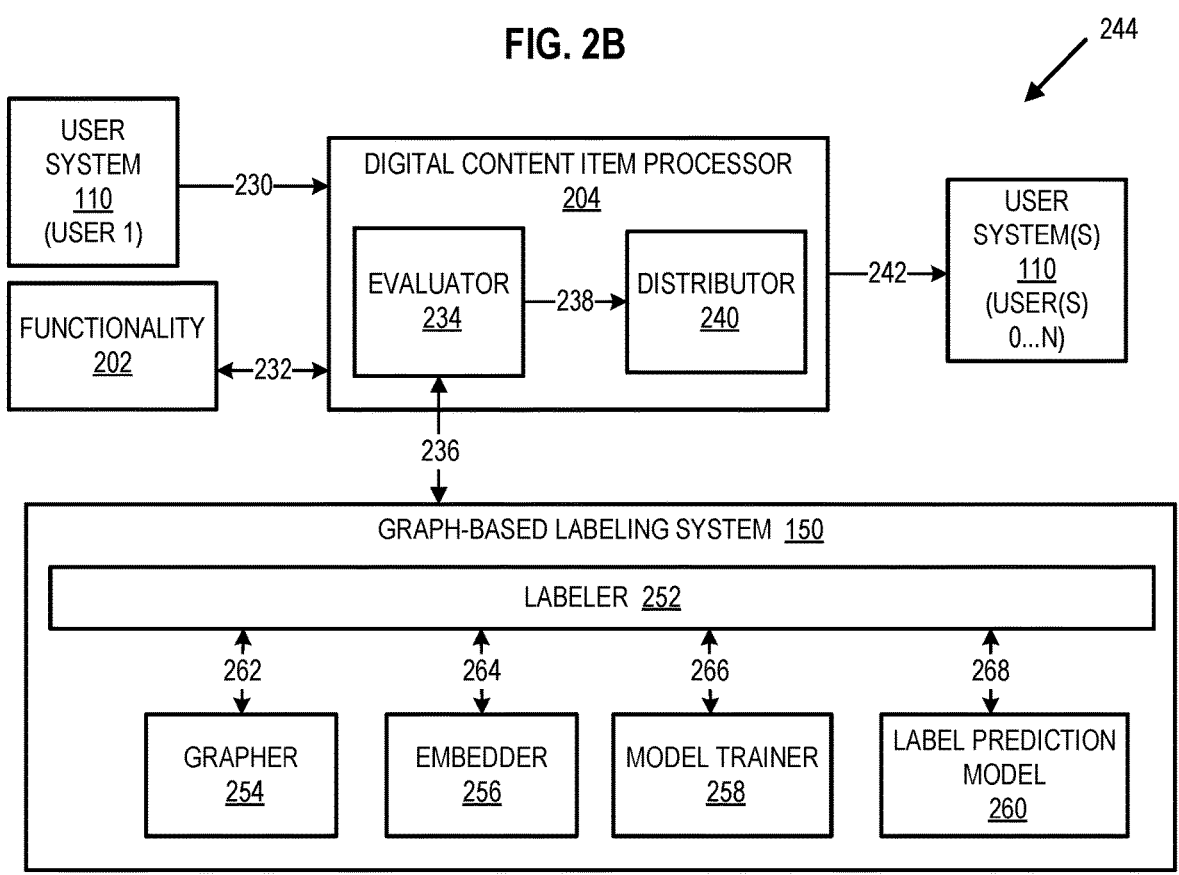
FIG. 2B illustrates an example of a digital content item processor in communication with the graph-based labeling system in accordance with some embodiments of the present disclosure.

FIG. 2B illustrates an example flow 244 of operations of an embodiment of digital content item processor 204 in communication with graph-based labeling system 150 in accordance with some embodiments of the present disclosure. Portions of flow 244 can be implemented as online operations while other portions of flow 244 can be implemented as offline or nearline operations. For example, operations performed by digital content item processor 204 and labeler 252 can be implemented as online operations while operations performed by grapher 254, embedder 256, and/or model trainer 258 can be implemented as offline operations.

In the example of FIG. 2B, digital content item processor 204 receives incoming digital communications from a user system 110 (user 1) via a communicative coupling 230 and/or functionality 202 via a communicative coupling 232. In response to an incoming digital communication, digital content item processor 204 sends outgoing digital communications to zero or more user system(s) 110 (user(s) 0 . . . N, where N is a positive integer) and/or functionality 202 via a communicative coupling 242.

An example of a digital communication that can be received by digital content item processor 204 from user system 110 (user 1) is a signal containing a digital content item, a digital content item identifier, a digital content item identifier and an entity identifier, or a command that includes a digital content item identifier and/or an entity identifier. Examples of commands that can be received by digital content item processor 204 from user system 110 (User 1) include upload, post, comment, and share.

An example of a digital communication that can be received by digital content item processor 204 from functionality 202 is a digital content item, a digital content item identifier, a digital content item identifier and an entity identifier, or a call that includes a digital content item identifier and/or an entity identifier. Examples of functionality 202 that can issue calls to digital content item processor 204 include feed services, search engines, and recommender systems.

For example, a feed service can submit a digital content item to digital content item processor 204 before the feed service includes the digital content item in a user's feed. For instance, the feed service can use a label produced by graph-based labeling system 150 to determine whether to include the digital content item in a user's feed.

A search engine can submit a digital content item to digital content item processor 204 before the search engine includes the digital content item in a user's search result. For example, the search engine can use a label produced by graph-based labeling system 150 to determine whether to include the digital content item in a search result.

A recommender system can submit a digital content item to digital content item processor 204 before the recommender system sends a recommendation notification including the digital content item to a user. For example, the search engine can use a label produced by graph-based labeling system 150 to determine whether to include the digital content item in a recommendation notification.

Examples of outgoing digital communications that digital content item processor 204 can send to zero or more user system(s) 110 via a communicative coupling 242 include network messages containing or referencing digital content items to be included in a feed, a search result, or a recommendation notification of one or more user systems 110.

In the example of FIG. 2B, digital content item processor 204 includes an evaluator 234 and a distributor 240. Evaluator 234 checks communications received from user system 110 and/or functionality 202 for semantic labels and/or other metadata that can indicate that a digital content item identified in the communication already contains a semantic label that can be used to control distribution of the digital content item in application system 130.

If evaluator 234 determines that a digital content item identified in the communication already contains a semantic label that can be used to control distribution of the digital content item in application system 130, and label prediction model 260 is in a prediction mode, evaluator 234 forwards the communication to distributor 240 via a communicative coupling 238. If evaluator 234 determines that a digital content item identified in the communication already contains a semantic label that can be used to control distribution of the digital content item in application system 130 and label prediction model 260 is in a training mode, evaluator 234 forwards the communication to graph-based labeling system 150 via a bidirectional communicative coupling 236. To determine whether label prediction model 260 is in a training mode or a prediction mode, evaluator 234 can check the value of a flag that is set for label prediction model 260 by, e.g., model trainer 258.

If evaluator 234 determines that a digital content item identified in the communication does not contain a semantic label that can be used to control distribution of the digital content item in application system 130, evaluator 234 forwards the communication to graph-based labeling system 150 via bidirectional communicative coupling 236.

In response to a received communication from evaluator 234, graph-based labeling system 150 generates a semantic label that can be used to control distribution of the digital content item identified in the communication in application system 130. Graph-based labeling system 150 returns the generated label to evaluator 234. In response to receiving a label from graph-based labeling system 150, evaluator 234 forwards the received label to distributor 240.

In response to receiving a label from evaluator 234, distributor 240 compares the label to a stored policy or set of policies, such a set of spam policies and/or content moderation policies. To do this, distributor 240 can determine whether the label matches a label associated with the predefined policy or any policy in the set of policies. If the label matches a policy, distributor 240 traverses the policy that matches the label to determine content distribution instructions associated by the policy with the label. If the label does not match a policy, distributor 240 distributes the digital content item to up to N user systems within application system 130 via communicative coupling 242, where N is a positive integer.

If the label matches a policy, distributor 240 executes the content distribution instructions that are associated with the label by the matched policy. In doing so, distributor 240 distributes the digital content item associated with the label to zero or less than N user systems 110 (users 0 . . . N) within application system 130 in accordance with the content distribution instructions.

If the content distribution instructions indicate that, based on the label, the distribution of the digital content item is unrestricted, distributor 240 can distribute the digital content item to more than zero and up to N user systems. If the content distribution instructions indicate that distribution of the digital content item is restricted, distributor 240 can distribute the digital content item to zero or less than N user systems.

A policy can be defined in terms of social graph 212. For example, a policy can contain content distribution instructions to limit distribution of a digital content item containing a label of "personal" to first-degree connections of the user associated with the digital content item or to constrain distribution of a digital content item containing a label of "political" only to users who follow entities that generate political posts. As another example, a policy can contain content distribution instructions to route digital content items labeled as "not suitable for work" or "fraud" to another destination, such as a user system 110 that has been designated as a honeypot, spam trap, or quarantine.

Examples of policies include user- and/or system-specified spam policies (e.g., unsubscribe, unfollow, subscribe, follow) and content moderation policies. Policies can be derived based on entity data 206, activity data 208, and/or social graph 212. For example, a policy can contain content distribution instructions to constrain distribution of a digital content item labeled "machine learning" to entities having a job title of "software engineer," or to constrain distribution of a digital content item labeled "baseball" only to entities that previously have viewed or liked digital content items pertaining to baseball.

Policies and the associated content distribution instructions can be implemented, for example, using Boolean logic or a lookup operation that traverses a data structure that maps labels to content distribution instructions.

In the example of FIG. 2B, graph-based labeling system 150 includes a labeler 252, a grapher 254, an embedder 256, a model trainer 258, and a label prediction model 260. Grapher 254, embedder 256, model trainer 258, and label prediction model 260 are communicatively coupled to labeler 252 by bidirectional communicative couplings 262, 264, 266, 268, respectively.

Labeler 252 communicates bidirectionally with evaluator 234. For example, labeler 252 receives a digital content item communication from evaluator 234, obtains inputs needed by label prediction model 260 to produce a label prediction, and provides a label predicted by label prediction model 260 responsive to the received digital content item to evaluator 234. As an alternative implementation, label prediction model 260 can communicate label prediction data directly to evaluator 234, in which case labeler 252 assembles the inputs needed for label prediction model 260 to generate a label prediction but does not communicate the label prediction to evaluator 234.

After receiving a digital content item communication from evaluator 234, labeler 252 obtains the set of inputs for label prediction model 260 to produce label prediction output. The set of inputs includes, for a digital content item, a content graph generated by grapher 254 and an embedding generated by embedder 256. If label prediction model 260 is in a training mode, the set of inputs also includes a label determined by model trainer 258.

Labeler 252 receives digital communications identifying digital content items and associated entity identifiers from evaluator 234. In response to receiving a communication identifying a digital content item, labeler 252 forwards the digital content item identifier data to grapher 254 via communicative coupling 262 and to embedder 256 via communicative coupling 264. If label prediction model 260 is in a training mode, labeler 252 also forwards the digital content identifier data to model trainer 258.

There are multiple alternatives for implementing grapher 254. In one implementation, offline processes are run periodically to generate a full content graph or set of content graphs that represent all content items in the application system. Then, when grapher 254 receives a digital content item identifier from labeler 252, grapher 254 extracts a sub-graph of the larger, previously created, and stored content graph, where the sub-graph is specific to the digital content item identifier received from labeler 252. In this example, the operations needing to be performed by grapher 254 at the time of receipt of a communication from labeler 252 may include a simple set of queries of the previously created content graph.

In another implementation, grapher 254 generates a content graph "on the fly" upon receiving a digital content item identifier from labeler 252. In this example, grapher 254 queries a non-graph database to obtain data records for the digital content item identified by the digital content item identifier received from labeler 252, extracts attribute and relationship data from the non-graph data records, and translates the extracted data from a non-graph form to a graph using graph primitives. In this example, grapher 254 creates content item-specific content graphs on demand.

In any case, the content graphs created by grapher 254 in response to a communication from labeler 252 can be a relatively small graph that includes a node for the requested content item and adjacent nodes and edges. In other words, for purposes of responding to a communication from labeler 252, it may not be necessary for grapher 254 to generate a full content graph of all content items in the application system.

Thus, in response to receiving the digital content item identifier data from labeler 252, grapher 254 generates a content graph for the digital content item. To do this, grapher 254 can locate a node that corresponds to the digital content item in an existing content graph stored in, e.g., content item data 210, and extract a sub-graph from the content graph that contains the node that corresponds to the digital content item. For example, a sub-graph generated by grapher 254 can include the node that corresponds to the digital content item identified in the digital communication from evaluator 234 and adjacent nodes (e.g., nodes that are one edge or "hop" away from the node that corresponds to the digital content item). Grapher 254 can extract data from a content graph by, for example, issuing a query against a graph database in which the content graph is stored and retrieving the query results from the graph database.

Alternatively, in some implementations, content item data is stored in a non-graph data structure such as a key-value store or relational database of, e.g., content item data 210. In these implementations, grapher 254 can issue a query to extract relationship data for the digital content item from the data structure, where the relationship data may be determined based on key values, for example. Using, e.g., graph primitives, grapher 254 converts the non-graph node relationship data for the digital content item into a content graph in which the digital content item is represented as a node, related digital content items are represented as adjacent nodes, and edges between the digital content item node and the adjacent nodes are labeled with relationship type data.

Examples of inter-content item or inter-node relationship type data include temporal dependencies, such as article-comment, comment-reply, and comment-comment. Other examples of relationship type data include semantic relationships and social graph-based relationships. For example, grapher 254 can create an edge between nodes when the corresponding content items have the same content type, modality, language, or label.

As another example, grapher 254 can create an edge between nodes that represent heterogenous content items. For instance, grapher 254 can create an edge between a text article and an image comment, if the comment has a dependency relationship with the text article (e.g., the comment was submitted in a thread associated with the article). To illustrate further, grapher 254 can create an edge between, for example, a video comment of a thread associated with one post and another post that contains a video, even though there is no dependency relationship between the video comment and the video post, if grapher 254 determines that there is some other reason to create an edge between the video comment and the video post; for example, both the video comment and the video post depict a dancing elephant.

The digital content items selected by grapher 254 to create the content graph, or the content sub-graph selected by grapher 254, as the case may be, can include some digital content items that already have been labeled with semantic labels that can be used by distributor 240 to control distribution of digital content items within application system 130. Content items may have been previously labeled by, for example, previous operations of graph-based labeling system, by a pre-existing binary classifier, or by a previous human-based manual labeling process. In many use cases, however, there are only few content items that that are already labeled. If a content item has been previously labeled, an indication of the content item's label can be stored in an attribute of the node.

Examples of situations in which there may be a small number of labeled content items can occur, for instance, after a policy change or after an introduction of a new type of content item (e.g., detection of a new value of a content type attribute or modality attribute—for example, "podcast" as a modality when podcast has not previously been seen as a modality on other content items). Thus, the content graph produced by grapher 254 is often sparsely labeled in that the number of unlabeled nodes can be greater than the number of unlabeled nodes, with respect to a particular task/policy. For example, the ratio of labeled nodes to unlabeled nodes can be 1:M, where M is a positive integer that is greater than 1 by X, where X can be a real number that is an offset or a multiplier.

As an example, suppose a new spam policy is implemented in the application system. To initialize the new spam policy, a relatively small number of content items are manually identified as triggering the new spam policy and are hand-labeled with the new spam label. Graph-based labeling system 150 uses this initial set of validated/ground truth labels for the new spam policy and the content graphs produced by grapher 254 to determine whether to apply the new spam label to other, unlabeled content items in the application system.

For instance, when grapher 254 receives a communication from labeler 252 that identifies an unlabeled content item, the graph created by grapher 254 for the identified unlabeled content item may or may not contain nodes that represent any of the content items that have been hand-labeled with the new spam label. The set of inputs to label prediction model 260, described below, include the graph data produced by grapher 254 for the identified unlabeled content item. Thus, the existence or non-existence of any labeled nodes in the graph data for the unlabeled content item is reflected in the input to label prediction model 260, and is thus reflected in the label prediction output by label prediction model 260 for that particular unlabeled content item.

The content graph produced by grapher 254 can include nodes that correspond to heterogenous digital content items. Heterogenous digital content items can refer to two or more digital content items that have different content types, modalities, and/or languages. For example, an article and a comment can be heterogenous because the length of text in a comment is typically much shorter than the article length. Image and text can be heterogenous because image data (e.g., pixel data) is different than alphanumeric text. Two different text items can be heterogenous if they are written in different languages.

The content graph produced by grapher 254 can contain edges that express dependencies or other types of relationships between heterogenous content types. For example, a pair of nodes can represent a text article and an image comment, respectively, and the edge between the nodes of the pair of nodes can indicate a dependency relationship between the text article and the image; e.g., that the image is a comment on the text article.

Grapher 254 can determine dependency relationships by, for example, comparing date/timestamps of digital content items such that a digital content item with a later timestamp can have a dependency on a digital content item with an earlier timestamp. Alternatively or in addition, dependency relationships such as post-comment and comment-reply can be made explicit when the digital content item data is stored in a non-graph data structure and therefore available to be extracted from the non-graph data structure by grapher 254.

Grapher 254 returns the generated content graph to labeler 252 or, alternatively, directly to label prediction model 260 or model trainer 258.

In response to receiving digital content item identifier data from labeler 252, embedder 256 generates an embedding for the identified digital content item. Embedding can refer to a semantic representation of a digital content item that is generated based on comparisons of values of features of the digital content item to values of corresponding features of other digital content items. An embedding can be implemented as a vector, where each dimension of the vector contains a value that corresponds to a different feature of the digital content items that contributes to a determination of its semantic meaning. Features of digital content items can include raw features extracted from the digital content item, such as pixels and n-grams, and/or computed features, such as counts, probabilities, average values, and mean values of raw features.

To generate an embedding, embedder 256 can apply a known embedding technique such as BERT (bidirectional encoder representations from transformers), Inception, or NetVLAD (net-vector of locally aggregated descriptor) to one or more portions of the digital content item to generate the embedding. Alternatively or in addition, embedder 256 can apply a universal language model (ULM) such as TULR-v3 (Turing universal language representation) to the digital content item, particularly if the digital content item is a multimodal and/or multilingual content item, to generate the embedding. Alternatively or in addition, embedder 256 can apply one or more of the embedding techniques described below with reference to FIG. 4C or FIG. 4D to the digital content item to generate the embedding. Embedder

256 returns the generated embedding to labeler 252 or, alternatively, directly to label prediction model 260 or model trainer 258.

Labeler 252 invokes model trainer 258 when label prediction model 260 is in a training mode. In the training mode, in response to receiving a digital content item identifier from labeler 252, model trainer 258 obtains a known semantic label for the digital content item (e.g., the digital content item has been previously labeled during an earlier round of training or by another labeling system), obtains an embedding for the digital content item from embedder 256, and obtains a content graph for the digital content item from grapher 254. Collectively, the known label for the digital content item, the embedding for the digital content item, and the content graph for the digital content item make up an instance of training data for an untrained or partially trained label prediction model 260.

To obtain known labels for training data, model trainer 258 can, for example, query content item data 210 stored in a non-graph database or traverse an existing content graph for previously labeled nodes (in the case where content graphs are previously created and stored). Model trainer 258 applies an untrained or partially trained label prediction model 260 to training data to produce a trained version of label prediction model 260.

Applying a model to training data can include executing a machine learning algorithm on a specified set of inputs that includes the training data to generate a set of outputs that correspond to the set of inputs. Thus, an untrained model can refer to a machine learning algorithm or set of machine learning algorithms implemented in computer code without reference to any data sets.

A trained model on the other hand can refer to the relationships between the sets of inputs and the outputs produced by the application of the machine learning algorithm to those sets of inputs, which are reflected in the values of the machine learning algorithm parameters. That is, application of the machine learning algorithm to training data adjusts the values of machine learning parameters iteratively until parameter values are found that produce statistically reliable output, e.g., predictions or classifications. A loss function can be used to compute model error (e.g., a comparison of model-generated values to validated or ground-truth values) to determine whether the model is producing reliable output or whether to adjust parameter values. The selection of machine learning algorithm, loss function, and associated parameter values can be dependent on the requirements of the particular application system; e.g., the type of output desired to be produced and the nature of the inputs.

Machine learning algorithm can refer to a single algorithm applied to a single set of inputs, multiple iterations of the same algorithm on different inputs, or a combination of different algorithms applied to different inputs. For example, in a neural network, a node corresponds to an algorithm that is executed on one or more inputs to the node to produce one or more outputs. A group of nodes each executing the same algorithm on a different input of the same set of inputs can be referred to as a layer of a neural network. The outputs of a neural network layer can constitute the inputs to another layer of the neural network. A neural network can include an input layer that receives and operates on one or more raw inputs and passes output to one or more hidden layers, and an output layer that receives and operates on outputs produced by the one or more hidden layers to produce a final output.

Label prediction model 260 is a machine learning model having a training mode and a prediction mode. In a training mode, training data is applied to an untrained or partially trained label prediction model 260 by model trainer 258 as described above. Partially trained can refer to a model that has been trained with only a small set of training data, or to a model that has been trained with training data that is now out of date or otherwise needs to be refreshed or updated.

In a prediction mode, label prediction model 260 generates label predictions in response to sets of inputs that include, for a given digital content item, a content graph produced by grapher 254 and an embedding produced by embedder 256. Labeler 252 forwards the label predictions produced by label prediction model 260 to evaluator 234 via communicative coupling 236 or alternatively, directly to distributor 240 via a different communicative coupling.

Example embodiments of label prediction model 260 are described below with reference to FIG. 4A and FIG. 4B1, FIG. 4B2, FIG. 4B3.

FIG. 3 is a flow diagram of an example method 300 for a processing device to label a digital content item in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the graph-based labeling system 150 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing device determines a sparsely labeled set of digital content items that are distributable by an application system over a network to a plurality of user systems based on a social graph, where the sparsely labeled set of digital content items includes an unlabeled digital content item. Operation 302 can be performed by the processing device querying a content item database to obtain a set of heterogenous digital content items that each have at least one type of relationship with the unlabeled digital content item.

In method 300, the flow 302, 304, 310 can be performed concurrently and/or independently of the flow 302, 306, 308, 310. That is, the process of determining embedding data can be done without the content graph.

Figure 4A:
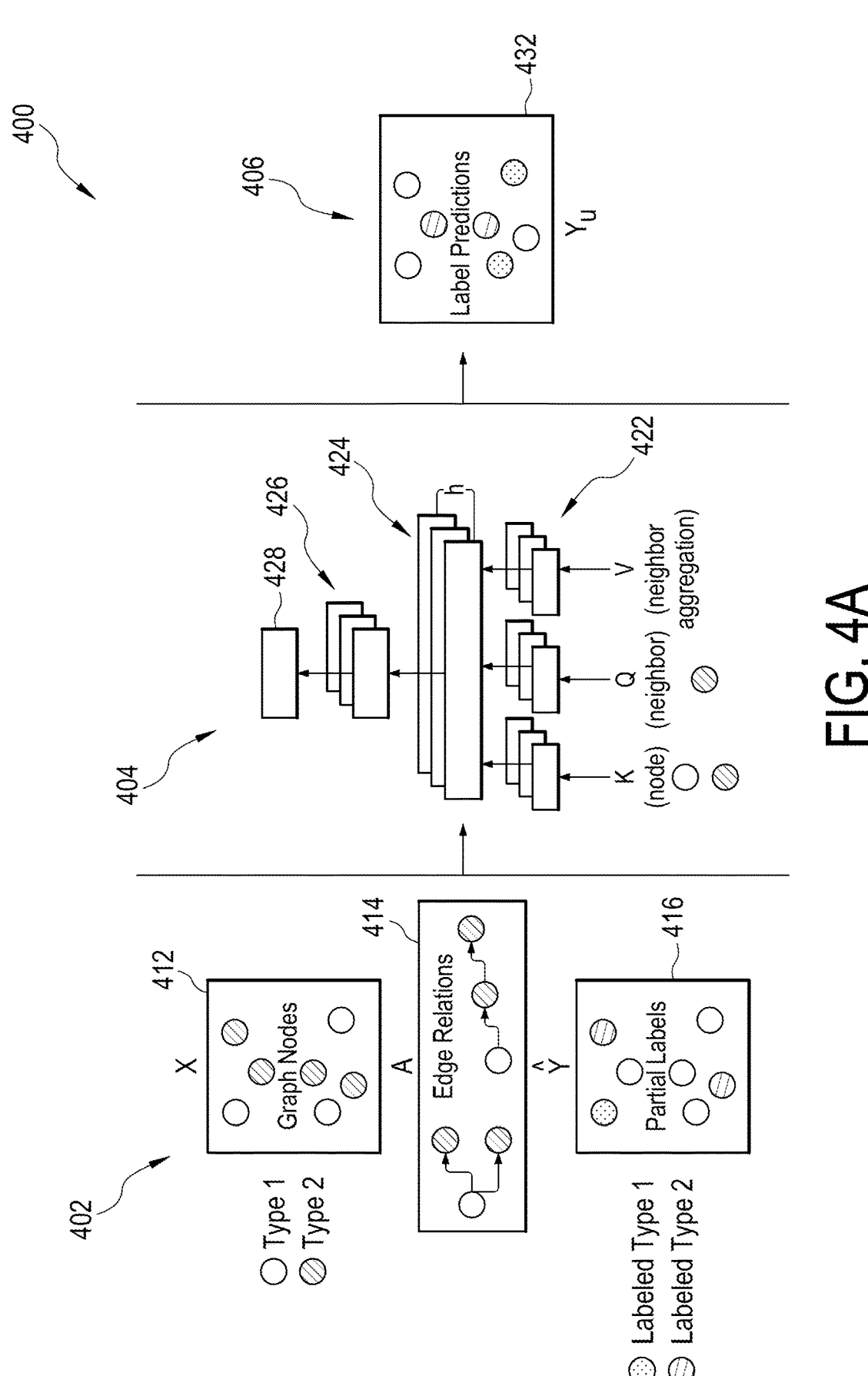
FIG. 4A is an example of a machine learning model architecture to label digital content items in accordance with some embodiments of the present disclosure.
Figure 4C:
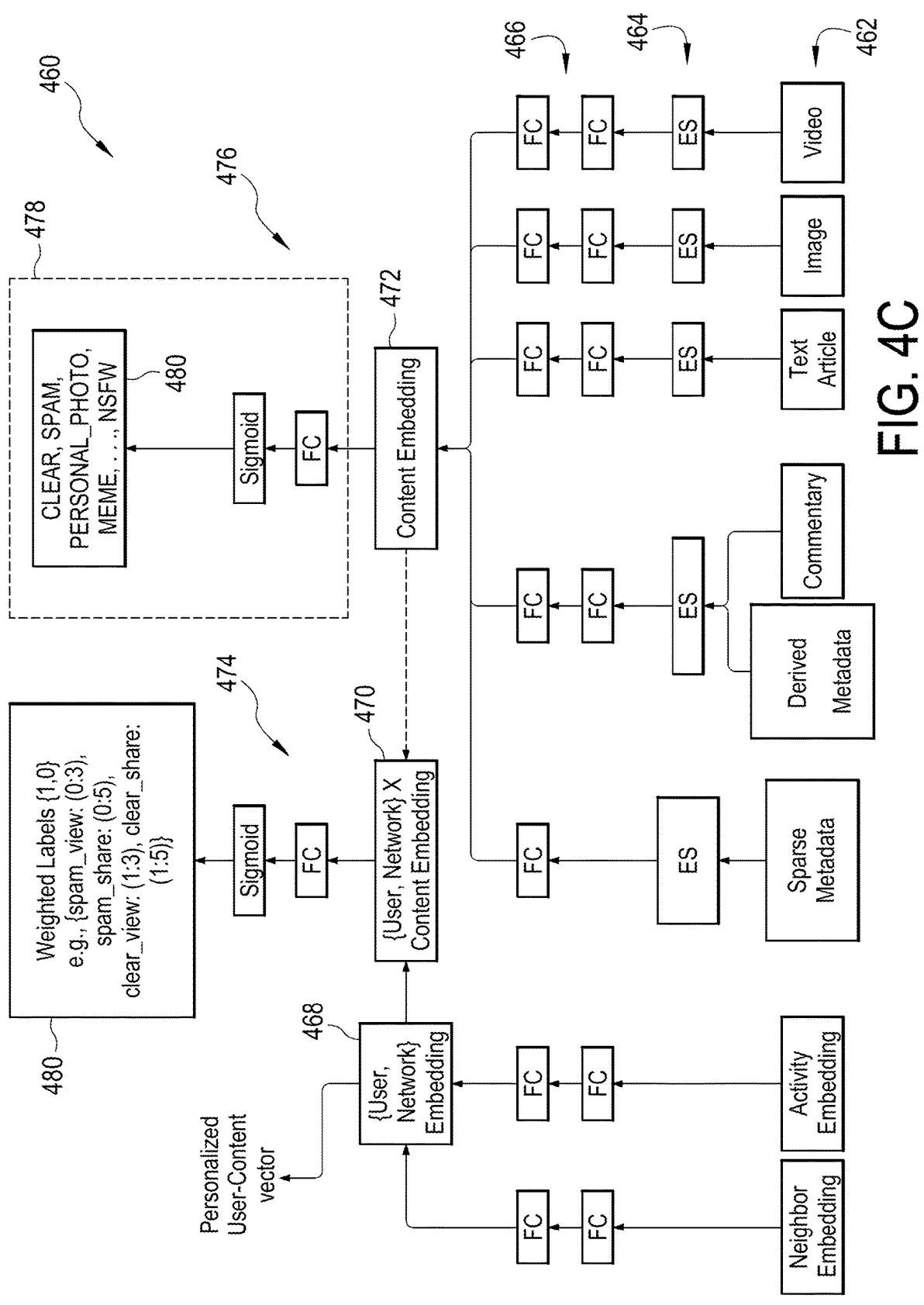
FIG. 4C is an example of a machine learning model architecture to generate embeddings for digital content items in accordance with some embodiments of the present disclosure.
Figure 4D:
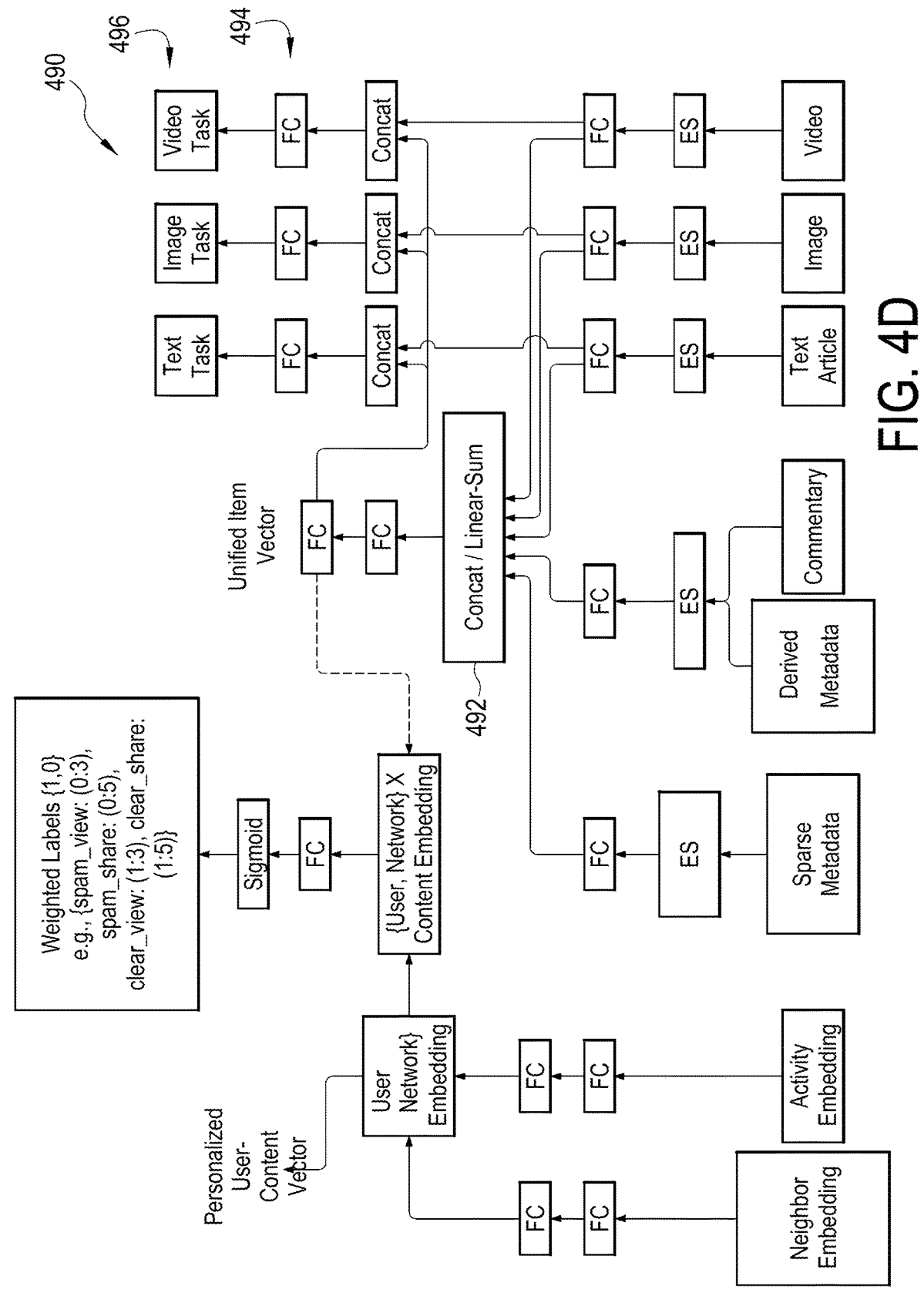
FIG. 4D is another example of a machine learning model architecture to generate embeddings for digital content items in accordance with some embodiments of the present disclosure.

At operation 304, the processing device determines embedding data for the unlabeled digital content item. To do this, operation 304 can include portions of the functionality of embedder 256, described above with reference to FIG. 2B. Operation 304 can apply a cross-modality model to the content item to produce a cross-modality embedding. Examples of cross-modality models that can be used by operation 304 to generate a cross-modality embedding are shown in FIG. 4C and FIG. 4D, described below.

Alternatively, operation 304 can apply an entity activity model to data associated with an entity represented in the social graph to produce an entity activity embedding and/or an entity activity-content item embedding. Examples of entity activity models that can be used by operation 304 to generate an entity embedding and/or an entity activity-content item embedding are shown in FIG. 4C and FIG. 4D, described below. As another alternative, operation 304 can machine learn the embedding data for the content item that corresponds to the unlabeled node by an embedding layer of the model. For example, outputs of embedder 256 can be fully connected to inputs of label prediction model 260.

At operation 306, the processing device generates a content graph for the set of heterogenous digital content items including the unlabeled digital content item. To do this, operation 306 can include portions of the functionality of grapher 254, described above with reference to FIG. 2B. Operation 306 can include converting non-graph query results into a graph representation of a set of heterogenous digital content items and inter-content item relationships. Alternatively, operation 306 can include traversing an existing content graph and extracting a subset of the existing content graph that contains the unlabeled digital content item.

A content graph generated by operation 306 includes nodes that correspond to content items of the set of heterogenous digital content items and edges that indicate relationships between content items of the set of heterogenous digital content items, where the nodes include more unlabeled nodes than labeled nodes.

At operation 308, the processing device extracts adjacency data for the unlabeled digital content item from the content graph produced by operation 306. The amount of adjacency data extracted for an unlabeled content item is configurable based on the requirements of a particular design or implementation. In some embodiments, adjacency data includes all node attribute data and edge relationship data for nodes that are N-degree connections with the node that corresponds to the unlabeled content item, where N is a positive integer and N=1. In other embodiments, N can be any positive integer.

Adjacency data can include edge data for an edge between an unlabeled node and an adjacent node. Adjacency data can include node attribute data, such as modality data for the unlabeled node and different modality data for the adjacent node. The modality data can indicate that the unlabeled node corresponds to content having a modality, e.g., text, image, video, or audio, and the different modality data can indicate that the adjacent node corresponds to content having a different modality, e.g., text, image, video, or audio. That is, the unlabeled node and the adjacent node can have different modalities; for example, the unlabeled node's modality can be a video while the adjacent node's modality is text, or the unlabeled node's modality can be text while the adjacent node's modality is live-streamed audio.

Adjacency data can include node attribute data, such as content type data and/or modality data for the unlabeled node and the adjacent node from the content graph. Adjacency data can include content type or modality data for the unlabeled node and different content type or modality data for the adjacent node. For instance, adjacency data can indicate that an unlabeled node corresponds to an article and that the adjacent node corresponds to commentary.

Alternatively or in addition, adjacency data can indicate that language data for the unlabeled node is different than language data for the adjacent node in the content graph. Additionally or alternatively, node attribute data for any node, e.g., the unlabeled node or the adjacent node, can indicate that the content item associated with the node contains text written or spoken in multiple different languages.

At operation 310, the processing device determines whether a labeling model is in a training mode or a prediction mode. To do this, the processing device can check the value of a flag set by model trainer 258. If the processing device determines that the labeling model is in a training mode, the processing device proceeds to operation 312. If the processing device determines that the labeling model is in a prediction mode, the processing device proceeds to operation 316. An example of a labeling model is shown in FIG. 4A and FIG. 4B2, described below.

At operation 312, the processing device obtains label training data for a sub-graph of the content graph. That is, the content graph generated at operation 306 is sparsely labeled such that only a sub-graph of the content graph contains labeled nodes. Operation 312 can obtain training data using, for example, model trainer 258, described above. At operation 314, the processing device applies the untrained or partially trained labeling model to a set of inputs including the embedding data, the adjacency data, and the label training data obtained in operation 312. As a result of operation 314, one or more parameter values of the labeling model can be adjusted to, for example, improve the prediction accuracy of the labeling model.

At operation 316, the processing device applies the trained labeling model to a set of inputs including the embedding data generated in operation 304 and the adjacency data extracted from the content graph in operation 308. The adjacency data included in the set of inputs can include modality data for the unlabeled node and different modality data for an adjacent node. The adjacency data included in the set of inputs can include the content type data for the unlabeled node and the different content type data for the adjacent node. The adjacency data included in the set of inputs can include language data for the unlabeled node and different language data for the adjacent node.

At operation 318, the processing device uses output of the labeling model to generate label data for the digital content item. Operation 318 can include providing the label data to the application system. Operation 318 can include generating a label for the content item, assigning a label to the content item, and/or labeling the content item with a label of a set of predefined labels, such as a set of spam labels, based on output produced by the labeling model in response to the set of inputs. Operation 318 can include providing the label to the application system.

FIG. 4A is an example of a model architecture 400 to label digital content items in accordance with some embodiments of the present disclosure. The model architecture of FIG. 4A is responsive to a set of model inputs 402. The set of model inputs 402 includes a set of heterogenous graph nodes 412, where each of the nodes 412 contains attributes of a digital content item. Examples of attributes include modality data and content type data. In one embodiment, the set of heterogenous graph nodes includes nodes that are at most N edges away from each other (Nth degree connections), where N is a positive integer and N=2. In other embodiments, N is any positive integer.

The set of heterogenous graph nodes 412 includes a subset of nodes of a first type and another subset of nodes of a second type, where the different node types indicate that the nodes represent different digital content items of different content types, modalities, and/or languages, for example. The set of heterogenous graph nodes 412 is obtained by, for example, querying a pre-existing content graph or generating a content graph by, for example, converting content item data stored in one or more non-graph data structures to a graph form.

In some embodiments, the set of model inputs 402 contains content embedding data X for each of the nodes in the set of heterogenous graph nodes 412. An embedding service, or a combination of embedding services such as a Universal Language Model (ULM) for text, Inception for images, and NetVLAD for videos, can be used to generate an embedding that represents multi-modal, multilingual content across heterogeneous content types and/or modalities. Examples of heterogenous content types and/or modalities include, for example, feed posts—text update, feed post—image, comment—text, comment—video, article, etc.

To generate text embeddings, a ULM is a massive transformer architecture-based deep learning language model, which learns billions of parameters from text datasets from the internet (for example, Wikipedia). An example of a ULM which can be used to generate embedding data X for text of each of the nodes 412 is the Turing Universal Language Representation (TULR-V3), available from Microsoft Corporation. The ULM embedding model can be fine-tuned for domain-specific use-cases. Other natural language processing (NLP) models can be used; however, benefits of ULMs are that ULMs support multilingual NLP tasks and can be used across a wide variety of applications. In some embodiments, the output of the embedding model is fully connected to the input of the label prediction model architecture.

To generate embeddings for image and video portions of the content items represented by the nodes 412, Inception and NetVLAD can be used, respectively. Thus, a node 412 that represents a multi-modal content item can have multiple different embeddings that have been generated by different embedding services. Examples of techniques that can be used to combine these different embeddings are described below with reference to FIG. 4C and FIG. 4D.

Embeddings for content items can be computed independently of the content graph. For example, an embedding can be computed for a content item that happens to be represented by a node in the graph, before the content graph is generated and without the need for the graph structure. Data about a content item can be provided to an embedding service from a non-graph database, for instance, or portions of the raw content item can be provided as input to an embedding service. Thus, content embeddings can be generated independently of the content graph and independently of any edge relations with other content items in the content graph. For example, an embedding service can be invoked by different process from the generation of the content graph.

The set of model inputs 402 contains edge relation data 414. Edge relation data indicates edge relations between the nodes of the set of heterogenous graph nodes 412, which are stored as an adjacency matrix A. Edge relation data 414 can include one-to-one relationships and one-to-many relationships. An example of one-to-one relationships is a feed post to a comment on the feed post to a reply to the comment. An example of a one-to-many relationship is a feed post to two different comments. Edge relation data 414 can be obtained by, for example, querying the content graph to retrieve the edge data.

When the labeling model is in a training mode, the set of model inputs 402 contains partial labels Y^. Partial labels indicates that the set of model inputs 402 is sparsely labeled. For example, in FIG. 4A, there are three Type 1 nodes and four Type 2 nodes, one of the three Type 1 nodes is labeled, and two of the four Type 2 nodes are labeled. Thus, in the example of FIG. 4A, 50% or less of the nodes are labeled. The threshold at which a set of nodes is considered sparsely labeled is variable depending on the requirements of a particular design or implementation. Also, while the described technologies are well-suited for sparsely labeled data sets, they are not limited to use with sparsely labeled data sets.

Model architecture 404 is a graph transformer-based neural network architecture that uses a label propagation algorithm to make label predictions for unlabeled nodes by executing label propagation steps iteratively. Unlike binary classifiers, graph transformers can capture inter-content item relationships (e.g., conversation context and/or the relation between, for example, post-comment, article-comment, comment-comment content item pairs).

Model architecture 404 can be implemented as a neural network that has separate layers for each modality and/or content type. For example, model architecture 404 can have a layer for articles and a layer for comments. The modality and/or content type-specific layers each can include multiple layers. The modality and/or content type-specific layers are connected; e.g. the output of the article layers constitutes the input of the comment layers or the output of the comment layers forms the input for the article layers. Thus, the different modality and/or content type-specific layers can share information between them in order to propagate labels across modalities and/or content types.

Modality and content type data each can be reflected in the attribute data for a node. Thus, content items of two different content types, e.g., article and comment or comment and reply, can have an edge between them irrespective of the modality of each of the content items. For example, an article can have a modality of text but share an edge with a comment that has a modality of image.

In operation, to model architecture 404 is applied to inputs X, A, and Y^ for a starting node K, and one or more Q neighbor (or adjacent) nodes. In querying the content graph, the starting (or source) node K is designated as the key and a neighbor node Q becomes the value. A neighbor vector can be generated for all neighbor nodes Q (e.g., all n-degree connections of K, where n can be any positive integer). Nodes K and Q can be referred to source and destination nodes, respectively, or collectively as an edge pair.

An additional input V is an aggregation of edge relation data between node K and each neighbor node Q over all of the Q neighbor nodes. The aggregation can be computed as, e.g., a mean or average of edge relation data over all of K's neighbor nodes Q.

If the source node is a labeled node and the destination node is an unlabeled node, then the model architecture 404 can generate a label prediction for the destination node, e.g., a probability that the source node's label also applies to the destination node. If the source node is an unlabeled node and the destination node is a labeled node, then the model architecture 404 is to generate a label prediction for the source node, e.g., a probability that the destination node's label also applies to the source node.

Model architecture 404 includes a multi-head-attention mechanism, which includes linear transformation layer 428, a scaled dot-product attention layer 426, a multiply layer 424, and a concatenation layer 422. The multi-head attention mechanism can run through an attention mechanism several times in parallel. Linear transformation layer 428 applies a linear transformation operation, e.g., a scalar function, to the inputs.

Scaled dot-product attention layer 426 can convert an input that is a vector of numbers into a vector of probabilities, where the probabilities of each value are proportional to the relative scale of each value in the vector. For example, scaled dot-product attention layer 426 can compute dot products of the inputs and scale them to summarize to 1, where h is a positive integer that refers to the number of hidden states between the input and output layers.

Multiply layer 424 applies a multiplication function to the inputs. Concatenation layer 422 concatenates the independent outputs of the multiply layer 424 to produce a final output that represents a probability that a label applies to an unlabeled node.

Model architecture 404 produces model output 406 that mathematically is given as P(Yu|X, A, Y), or the probability of the unlabeled content Yu given the inputs X (content embedding), A (adjacency matrix including content relationship edge data) and previously observed/predicted labels Y^ (if in training mode). Thus, model output can include a set of label prediction data 432 for the unlabeled nodes of the input X.

In FIG. 4A, label prediction data 423 shows the labels that were predicted by model architecture 404 based on the partially labeled data set 416 as follows: the nodes that are shaded (newly labeled) in label prediction data set 432 correspond to the unshaded (unlabeled) nodes in the partially labeled data set 416 and the unshaded nodes of label prediction data set 432 correspond to the shaded nodes of data set 416. In other words, data set 416 is the same data set as label prediction data set 432 except that label prediction data set 432 contains labels for all of the nodes in the data set while partially labeled data set 416 contains labels for only a portion of the nodes in the data set.

Unlike binary classifiers, the label propagation algorithm can capture labels across related/connected content types. This allows the labeling model to leverage partial label information to, for example, automatically propagate a label from an already-labeled article post to an unlabeled comment on the same article post, or automatically propagate a label from an already-labeled comment to the main article post, which was previously unlabeled. As a result, the labeling model can be trained with a far fewer number of labels than a binary classifier.

Unlike binary classifiers, model architecture 404 can train and predict using a single model for different content types and capture conversation context and interdependencies between both homogeneous and heterogeneous content types by modeling those dependencies as a content graph.

FIG. 4B1, FIG. 4B2, and FIG. 4B3 illustrate inputs for a model architecture to label digital content items in accordance with some embodiments of the present disclosure.

Portion 440 of FIG. 4B1 shows data extracted from a content graph that contains heterogenous graph nodes 412. An embedding X can be computed for each node of the content graph using a process 441. In process 441, the example input nodes are heterogenous even though they have the same modality, text. For instance, the Type 1 node can correspond to a comment while the Type 2 node can correspond to an article, or vice versa.

In process 441, a transformer-based neural network is applied to each input node to generate an embedding for each input node, respectively. For example, the transformer-based neural network generates an embedding X1 for the Type 1 node and an embedding X2 for the Type 2 node. A transformer-based neural network can be used for multiple different node types, or different embedding mechanisms can be used for different node types. The node embeddings produced by the transformer-based neural network are inputs to the labeling model, e.g., model architecture 404.

The transformer-based neural network framework allows heterogeneous content types to be input to the labeling model. Examples of a transformer-based neural network frameworks that can be used to generate content embeddings for text (e.g., articles and comments) include TuringULRv3 and mBERT. A content embedding produced by process 441 can be represented as a multi-dimensional vector. For example, mBERT produces an embedding that is a 768-dimensional vector and TULRv3 produces an embedding that is a 1024-dimensional vector. For image inputs, Inception v3 produces an embedding that is a 2048-dimension vector, and for videos, NetVLAD produces an embedding that is a 1024-dimension vector.

Process 441 can be performed by embedder 256.

Portion 442 of FIG. 4B2 illustrates an adjacency matrix A, which includes edge relation data 414 that describes relationships between heterogenous graph nodes 412. Edge relation data 414 and adjacency matrix A more generally can capture a conversation thread structure including multi-level dependency relationships between heterogenous content items. In the illustrated embodiments, the maximum adjacency is N degrees where N is a positive integer up to and including 2. In other embodiments, N can be any positive integer.

Portion 450 of FIG. 4B2 illustrates computation of edge relationships between heterogenous content items (e.g., nodes of different content types, languages, or modalities). The edge relationships can be computed using a pre-order tree traversal, using a timestamp as the key. For example, at time t0, an article A of Type 1 is posted to a feed, which is represented in the content graph as node 443. At time t1, a comment B of Type 2 is posted on Article A, which is represented in the content graph as node 445. Based on a comparison of time t1 to time t0 (e.g., time t1 is after time t0), an edge 444 is created from article A→comment B, or, in the content graph, from node 443 to node 445.

At time t2, a comment C of Type 2 is posted on Article A, which is represented in the content graph as a node 447. Based on a comparison of time t2 to time t0 and time t1 (e.g., time t2 is after time t0 and time t1), an edge 446 is created from article A→comment C, or, in the content graph, from node 443 to node 447.

At time t3, a comment D of Type 2 is posted as a reply on comment B, which is represented in the content graph as a node 449. Based on a comparison of time t3 to times t0, t1, and t2 (e.g., time t3 is after times t0, t1, and t2), an edge 448 is created from comment C comment D, or, in the content graph, from node 447 to node 449.

While FIG. 4B2 illustrates only two levels of content item dependencies, the enumeration of edges is not limited to two levels. Also, while FIG. 4B2 only illustrates two content types, any combination of nodes in the content graph can be heterogenous in any number of ways. For example, node 445 can be associated with a content item that contains a different modality, e.g., image instead of text, and the edge relationships would be computed in a similar way.

FIG. 4B3 illustrates an example 454 of determining training data for the labeling model, which can be implemented as model trainer 258. When the model is in a training mode, the input nodes include nodes that are labeled with validated or ground-truth labels, reflecting examples of content items in the training dataset that have already been labeled. As the training data set only includes some labeled nodes, e.g., less than half of the nodes are labeled, the training dataset contains partial labels of partially labeled dataset 416 as shown in portion 452 of FIG. 4B3.

To obtain training data, the model trainer can traverse the content graph and, at each node, check to see if the node is already labeled. If the node is already labeled, the node is added to a subset of the content graph that contains labeled nodes. If the node is not already labeled, the node is added to a different subset of the content graph that contains unlabeled nodes.

The training data includes heterogenous nodes, e.g., some labeled nodes of Type 1 content items and other labeled nodes of Type 2 content items. The unlabeled nodes can also be heterogenous, including both Type 1 and Type 2 content items, for example. The labeled nodes are used by the labeling model for label propagation.

Once the embeddings and the content item dependencies (graph adjacencies) are created as described above, label propagation and relationship-based label learning/predictions are computed in the graph transformer core of model architecture 401. For example, the labeling model computes, for each unlabeled node, a probability that a label of a labeled node applies to the unlabeled node.

FIG. 4C is an example of a model architecture to generate embeddings for digital content items in accordance with some embodiments of the present disclosure. The cross-modality embeddings that can be produced by a model architecture such as shown in FIG. 4C can be used as the embedding input X in FIG. 4A and FIG. 4B1, above. In this way, the label prediction model architecture of FIG. 4A and FIG. 4B2 can be extended to include multimodal embeddings for multi-modal content items.

Inputs 462 to a cross-modality model 460 can include content items of multiple different modalities including text, images, videos, commentary, derived metadata (e.g., text produced by optical character recognition or speech recognition), and sparse metadata (e.g., hashtags, topics). A single content item can include multiple different modalities. Inputs 462 can also include entity-related embeddings such as neighbor embeddings and entity activity embeddings.

Cross-modality model 460 treats content item classification as a shared task across modalities in which semantics can be learned in a joint fashion. Thus, for multi-modal content items, the different modalities are initially separated and individual embeddings are created for each different-modality part of the content item and then merged to create a unified or cross-modality embedding for the multi-modal content item.

Cross-modality model 460 utilizes a mid-gate fusion strategy to combine semantics from multiple different modalities to generate a cross-modality embedding 472. Cross-modality embedding 472 can be used as an input embedding X in FIG. 4A and FIG. 4B1. Thus, the input embedding X in FIG. 4A and FIG. 4B1 does not need to reflect only a single modality (e.g., text, image, or video) if the digital content item contains multiple different modalities. In other words, use of cross-modality model 460 to generate cross-modality embedding 472 can enable the model architectures of FIG. 4A and FIG. 4B2 to predict labels for multi-modal content items.

As shown in the right-hand side of the diagram, cross-modality content embedding 472 can be machine learned end to end with a specific set of loss functions (e.g., focal loss with hard negatives), and predictive components. Cross-modality model 460 includes shared layers per modality including embedding services 464 and fully connected layers 466. Examples of embedding services include BERT, Inception, NetVLAD, Transformer-based embedders, and lookup services. Cross-modality model 460 also includes a predictive component 476 which is multi-label with single head.

Responsive to the cross-modality embedding 472, predictive component 476 outputs a probability that a target label 480 applies to a content item based on its cross-modality embedding 472. Portion 478 of cross-modality model 460 can be trained independently or jointly with, for example, an engagement-related supervised task.

Target labels can be defined coarsely and/or finely as needed by the particular application system. Examples of coarsely defined labels are SPAM and CLEAR. Examples of finely defined labels include different types of spam content, such as Financial Fraud or NSFW, and different types of non-spam content, such as Education Video or Healthy Lifestyle.

The cross-modality content embedding 472 can be frozen while a user activity embedding 468 is generated or fine-tuned, as shown in the left-hand side of the diagram. In other words, cross-modality content embedding 472 and user activity embedding 468 can be created independently using different inputs and then fused using e.g., concatenation. User activity data used to generate the user activity embedding 468 can be obtained by, for example, querying entity data 206, activity data 208 and/or social graph 212. For instance, activity data 208 can include data that indicates which content items have been posted by, commented on, viewed, and shared by a user, and when, in application system 130. User activity data and user profile data can be represented in social graph 212.

Cross-modality content embedding 472 can be published for use by downstream applications. For example, cross-modality content embedding 472 can be consumed by a feed ranking system and/or content moderation systems. An advantage of cross-modality content embedding 472 is that downstream systems do not need to check the modality of a content item but rather can call the cross-modality model 460 for content items regardless of modality and even if the content item contains multiple modalities.

Cross-modality model 460 can be implemented as a backend service, e.g., a database or cloud service that stores cross-modality content embeddings 472 for other downstream systems to query and retrieve. For example, a downstream system such as a news feed can have its own content classifier, and can use cross-modality content embedding 472 as an input to its classifier. Cross-modality model 460 can improve the use of system resources by replacing 50+ individual binary classifiers for spam detection and content moderation.

Cross-modality content embedding 472 can be combined or fused, e.g., by concatenation, with the generated or fine-tuned user activity embedding 468 to produce a user-content embedding 470. User-content embedding 470 can join together information that is typically or historically independent and unlinked. That is, user-content embedding 470 can create previously nonexistent links between social graph 212 and activity data 208.

User activity embedding 468 is generated based on pre-existing embeddings including a neighbor embedding and an activity embedding. An activity embedding is generated based on a user's activity in their session feed, e.g., clicks, likes, and shares, as determined using activity data 208. A neighbor embedding creates a similar activity embedding for a neighbor (e.g., a first-degree connection) of the user as determined using social graph 212.

Responsive to the user-content embedding 470, a predictive component 474 can generate and output a probability that a user of the application system will engage in a particular type of activity in the application system given a content item assigned to a particular target label 480. For example, predictive component 474 can adjust the output of predictive component 476 by a weight, where the weight value corresponds to the user activity embedding 468.

Examples of output of predictive component 474 include a likelihood that a user will view spam, a likelihood that a user will share spam, a likelihood that a user will view content items not labeled as spam, and a likelihood that a user will share content items not labeled as spam.

FIG. 4D is another example of a model architecture 490 to generate embeddings for digital content items in accordance with some embodiments of the present disclosure.

The model architecture 490 of FIG. 4D is similar to FIG. 4C in that it is an example of a unified architecture for content labeling with shared layers per modality. Instead of a multi-label with single head predictive component, the predictive component of model architecture 490 uses auxiliary loss from modality specific heads, as illustrated by concat/linear-sum component 492, fully connected layers 494, and task layer 496. For example, concat/linear sum component 492 combines the single-modality embeddings generated for each of the inputs (sparse metadata, activity derived metadata, commentary, text article, image, video), and the output of concat/linear-sum component 492 is provided to modality-specific classification tasks (e.g., text task, image task, video task) in addition to being available to create the combined user-content embedding 470 through which user and content embeddings are jointly labeled.

Figure 5:
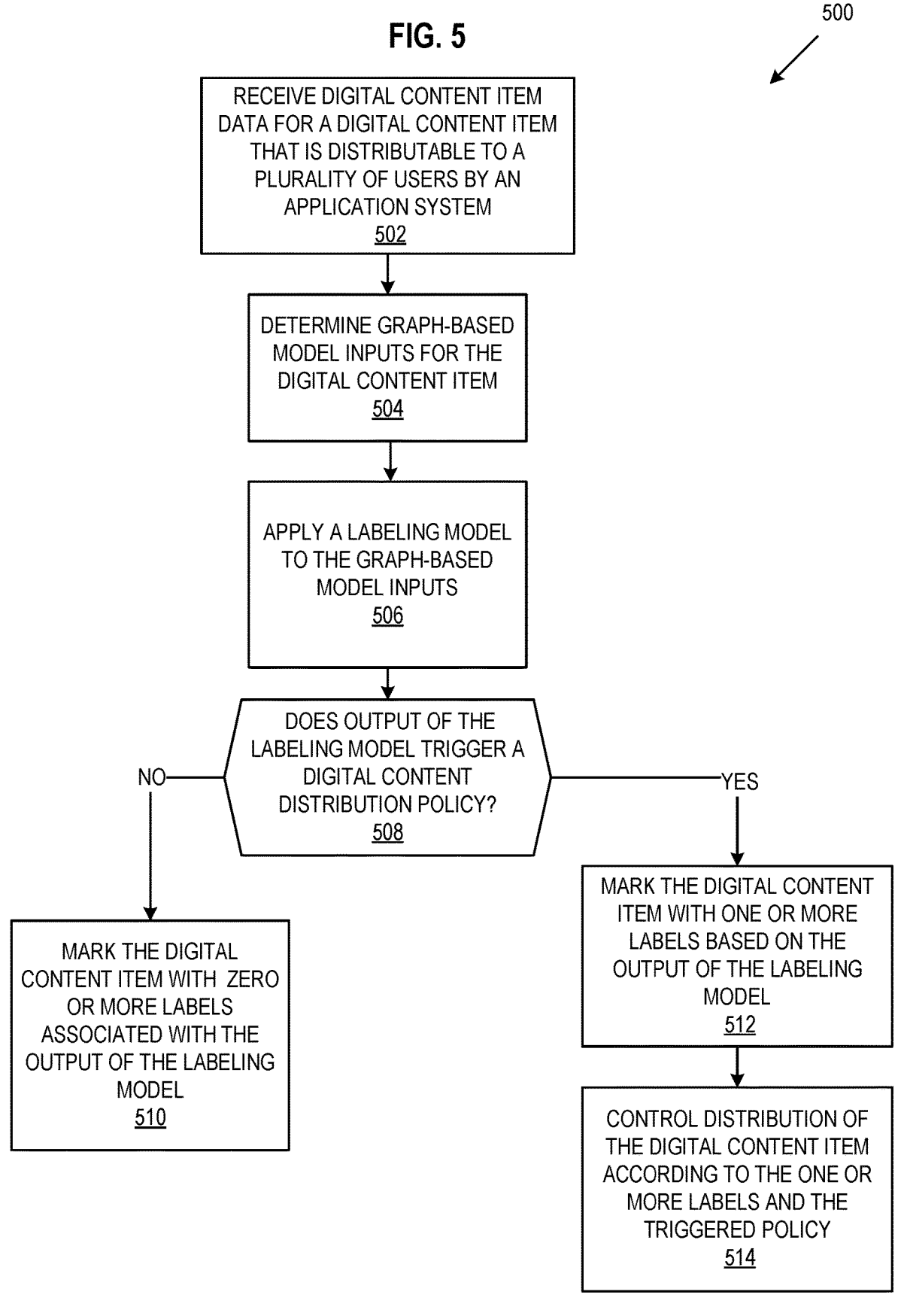
FIG. 5 is a flow diagram of an example method to control distribution of digital content items in accordance with some embodiments of the present disclosure.

FIG. 5 is a flow diagram of an example method 500 to control distribution of digital content items in accordance with some embodiments of the present disclosure.

The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, portions of the method 500 are performed by the application system 130 and/or the graph-based labeling system 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device receives digital content item data for a digital content item that is distributable to users by an application system. Operation 502 can include performing functionality of digital content item processor 204, described above. Operation 502 can include receiving a content item at an application system that distributes digital content to user systems on a network, and forwarding the received content item and an address that identifies an origin of the received content item on a network to a labeling system that generates labels for digital content.

At operation 504, the processing device determines graph-based model inputs for the digital content item. Operation 504 can include performing functionality of grapher 254 and embedder 256, described above. For example, operation 504 can include generating a content graph that includes nodes that correspond to content items of a set of digital content items distributable by the application system that includes the content item received at operation 502 and edges that indicate relationships between content items of the set of digital content items including the received content item.

At operation 506, the processing device applies a labeling model to the graph-based model inputs determined in operation 504. Operation 506 can include performing functionality of label prediction model 260, described above. For example, operation 506 can include extracting edge data from the content graph for an edge between a node that corresponds to the received content item and an adjacent node, and applying a model trained on labeled nodes of the content graph to a set of inputs that include the edge data and embedding data for the received content item. An example of a labeling model is shown in FIG. 4A and FIG. 4B2, described above.

At operation 508, the processing device determines whether output of the labeling model of operation 506 triggers a digital content distribution policy. Operation 504 can include performing functionality of graph-based labeling system 150 and/or distributor 240, described above. If the processing device determines that the labeling model output does not trigger a digital content distribution policy, the processing device advances to operation 510. If the processing device determines that the labeling model output triggers a digital content distribution policy, the processing device advances to operation 512.

At operation 510, the processing device marks the digital content item with zero or more labels associated with the output of the labeling model. At operation 512, the processing device marks the digital content item with one or more labels based on the output of the labeling model. Marking a digital content item with one or more labels can include storing a label value in a data record associated with the digital content item in content item data 210.

At operation 514, the processing device control distribution of the digital content item according to the one or more labels with which the digital content item is marked in operation 512 and the triggered content distribution policy. Operation 514 can include forwarding the label to an application system. Operation 514 can include, at the application system, distributing the received content item to a plurality of other addresses on the network in accordance with the label. Operation 514 can include, at the application system, determining, based on the label, that the received content item triggers a policy. Operation 514 can include, at the application system, controlling distribution of the received content item on the network in accordance with the triggered policy. The label can correspond to a content category, such as spam, not suitable for work, personal, adult content, inflammatory, hate speech, illegal, contraband, or another category of readily perceivable unwanted content.

FIG. 6 illustrates an example machine of a computer system 600 within which a set of instructions, for causing the machine to perform any one or more of the methodologies discussed herein, can be executed. In some embodiments, the computer system 600 can correspond to a component of a networked computer system (e.g., the computer system 100 of FIG. 1) that includes, is coupled to, or utilizes a machine to execute an operating system to perform operations corresponding to the graph-based labeling system 150 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a memory 606 (e.g., flash memory, static random-access memory (SRAM), etc.), an input/output system 'Z10, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

The computer system 600 can further include a network interface device 608 to communicate over the network 620. Network interface device 608 can provide a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet 628 and network interface device 608. The received code can be executed by processing device 602 as it is received, and/or stored in data storage system 640, or other non-volatile storage for later execution.

The input/output system 610 can include an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 can include a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 626 include instructions to implement functionality corresponding to a digital content item labeling component (e.g., the graph-based labeling system 150 of FIG. 1). While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods described above, including the method shown by FIG. 2B, method 300, and method 500, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes, for a set of digital content items received from user systems by an application system, generating and storing a content graph. The application system is capable of distributing digital content to the user systems over a network based on a social graph and a set of spam labels. The content graph includes labeled nodes that correspond to a subset of the set of digital content items that have spam labels, unlabeled nodes that correspond to a subset of the set of digital content items that do not have spam labels, and edges that indicate relationships between a subset of the set of digital content items. The content graph includes more unlabeled nodes than labeled nodes. The method also includes querying the content graph to retrieve edge data for an edge between an unlabeled node and an adjacent node. The unlabeled node corresponds to a digital content item that does not have a spam label. The adjacent node corresponds to a different digital content item. The edge data indicates a relationship between the unlabeled node and the adjacent node. The method also includes, responsive to a set of inputs including the retrieved edge data and embedding data associated with the unlabeled node, by a machine learning model trained on labeled nodes and edges of the content graph, assigning a label of the set of spam labels to the unlabeled node.

An example 2 includes the subject matter of example 1, further including querying the content graph to retrieve modality data for the unlabeled node and different modality data for the adjacent node, and, responsive to the set of inputs including the modality data for the unlabeled node and the different modality data for the adjacent node, by the machine learning model, determining the label for the unlabeled node. An example 3 includes the subject matter of example 1 or example 2, further including querying the content graph to retrieve content type data for the unlabeled node and different content type data for the adjacent node, and, responsive to the set of inputs including the content type data and the different content type data, by the machine learning model, determining the label for the unlabeled node. An example 4 includes the subject matter of any of examples 1-3, further including, by a cross-modality model trained on digital content items of different modalities, generating a cross-modality embedding for the digital content item, and, responsive to the set of inputs including the cross-modality embedding, by the machine learning model, determining the label for the unlabeled node. An example 5 includes the subject matter of any of examples 1-4, further including responsive to activity data of an entity that is associated with the digital content item and represented in a social graph, by an entity activity model trained on entity activity data extracted from the application system, generating an entity activity-content item embedding, and, responsive to the set of inputs including the entity activity-content item embedding, by the machine learning model, determining the label for the unlabeled node. An example 6 includes the subject matter of any of examples 1-5, further including machine learning the embedding data associated with the unlabeled node by an embedding layer of the machine learning model, and responsive to the set of inputs including the machine learned embedding data, by the machine learning model, determining the label for the unlabeled node.

In an example 7 a system includes at least one processor and at least one computer memory operably coupled to the at least one processor. The at least one computer memory includes instructions that when executed by the at least one processor are capable of causing the at least one processor to: generate a content graph for a set of heterogenous digital content items received by an application system that distributes digital content over a network to a plurality of user systems; the content graph including nodes that include labeled nodes that correspond to content items of the set of heterogenous digital content items that have a spam label and unlabeled nodes that correspond to content items of the set of heterogenous digital content items that do not have a spam label, and edge data that indicate inter-content item relationships between the nodes; and train a neural network model on a set of inputs including the content graph to produce a trained neural network model.

An example 8 includes the subject matter of example 7, where the at least one computer memory further includes instructions that when executed by the at least one processor are capable of causing the at least one processor to extract content type data for a node from the content graph, extract different content type data for an adjacent node from the content graph, and train the neural network model on the set of inputs including the content type data and the different content type data. An example 9 includes the subject matter of example 8, where the content type data indicates that the node corresponds to content that is a first type of a post, an article, a comment, or a reply, and the different content type data indicates that the adjacent node corresponds to a second type that is different than the first type. An example 10 includes the subject matter of any of examples 7-9, where the at least one computer memory further includes instructions that when executed by the at least one processor are capable of causing the at least one processor to extract modality data for a node from the content graph, extract different modality data for an adjacent node from the content graph, and train the neural network model on the set of inputs including the modality data and the different modality data. An example 11 includes the subject matter of any of examples 7-10, where the modality data indicates that the node corresponds to content having a first modality of a text, image, video, or audio; and the different modality data indicates that the adjacent node corresponds to a second modality that is different one than the first modality. An example 12 includes the subject matter of any of examples 7-11, where the at least one computer memory further includes instructions that when executed by the at least one processor are capable of causing the at least one processor to apply a cross-modality model to a content item of the set of heterogenous digital content items to produce a cross-modality embedding and train the neural network model on the set of inputs including the cross-modality embedding. An example 13 includes the subject matter of any of examples 7-12, where the at least one computer memory further includes instructions that when executed by the at least one processor are capable of causing the at least one processor to apply an entity activity model to data associated with an entity represented in a social graph to produce an entity activity embedding and train the neural network model on the set of inputs including the entity activity embedding. An example 14 includes the subject matter of any of examples 7-13, where the at least one computer memory further includes instructions that when executed by the at least one processor are capable of causing the at least one processor to machine learn embedding data by an embedding layer of the neural network model and use the machine learned embedding data as an input to another layer of the neural network model.

In an example 15, a method includes: receiving a content item at an application system that controls distribution of digital content to a plurality of user systems on a network based on a set of spam labels; forwarding the received content item to a labeling system that generates labels for digital content; at the labeling system, (i) generating and storing a content graph including nodes that correspond to content items of a set of digital content items distributable by the application system including the received content item and edges that indicate relationships between content items of the set of digital content items including the received content item, (ii) querying the content graph to retrieve edge data for an edge between a node that corresponds to the received content item and an adjacent node, and (iii) responsive to a set of inputs including the edge data and embedding data for the received content item, at a machine learning model trained on labeled nodes and edges of the content graph, assigning a label of the set of spam labels to the received content item.

An example 16 includes the subject matter of example 15, further including, at the labeling system, forwarding the label assigned to the received content item to the application system. An example 17 includes the subject matter of example 15 or example 16, further including, at the application system, distributing the received content item to the plurality of user systems on the network in accordance with the label. An example 18 includes the subject matter of any of examples 15-17, further including, at the application system, determining, based on the label, that the received content item triggers a policy. An example 19 includes the subject matter of any of examples 15-18, further including, at the application system, controlling distribution of the received content item on the network in accordance with the triggered policy. An example 20 includes the subject matter of any of examples 15-20, where the node that corresponds to the received content item and the adjacent node are heterogenous.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

for a set of digital content items received from user systems by an application system, generating and storing a content graph, wherein:

the application system is capable of distributing digital content to the user systems over a network based on a social graph and a set of spam labels; and the content graph comprises labeled nodes that correspond to a subset of the set of digital content items that have spam labels, unlabeled nodes that correspond to a subset of the set of digital content items that do not have spam labels, and edges nodes of the content graph;

querying the content graph to retrieve edge data for an edge between an unlabeled node and an adjacent node, wherein:

the unlabeled node corresponds to a digital content item that does not have a spam label;

the adjacent node corresponds to a different digital content item; and the edge data indicates a relationship between the unlabeled node and the adjacent node; and responsive to a set of inputs comprising the retrieved edge data and embedding data associated with the unlabeled node, by a machine learning model, assigning a label of the set of spam labels to the unlabeled node, wherein:

the embedding data comprises output of a cross-modality embedding model;

the output of the cross-modality embedding model is connected to input of the machine learning model;

the machine learning model comprises a graph transformer-based neural network having connected modality-specific layers;

the graph transformer-based neural network is trained to determine inter-content item relationships based on the labeled nodes and the edges of the content graph; and the label is assigned to the unlabeled node by the connected modality-specific layers of the trained graph transformer-based neural network performing graph-based propagation of label predictions from labeled nodes to unlabeled nodes of different modalities based on edge relationships between the nodes in the content graph.

2. The method of claim 1, further comprising querying the content graph to retrieve modality data for the unlabeled node and different modality data for the adjacent node, and, responsive to the set of inputs including the modality data for the unlabeled node and the different modality data for the adjacent node, by the machine learning model, determining the label for the unlabeled node.

3. The method of claim 1, further comprising querying the content graph to retrieve content type data for the unlabeled node and different content type data for the adjacent node, and, responsive to the set of inputs including the content type data and the different content type data, by the machine learning model, determining the label for the unlabeled node.

4. The method of claim 1, further comprising, by the cross-modality embedding model trained on digital content items of different modalities, generating a cross-modality embedding for the digital content item, and, responsive to the set of inputs including the cross-modality embedding, by the machine learning model, determining the label for the unlabeled node.

5. The method of claim 1, further comprising responsive to activity data of an entity that is associated with the digital content item and represented in a social graph, by an entity activity model trained on entity activity data extracted from the application system, generating an entity activity-content item embedding, and, responsive to the set of inputs including the entity activity-content item embedding, by the machine learning model, determining the label for the unlabeled node.

6. The method of claim 1, further comprising machine learning the embedding data associated with the unlabeled node by an embedding layer of the machine learning model, wherein the embedding layer of the machine learning model comprises the cross-modality embedding model, and responsive to the set of inputs including the machine learned embedding data, by the machine learning model, determining the label for the unlabeled node.

7. A system comprising:
a processor; and
memory coupled to the processor, wherein the memory comprises instructions that when executed by the processor cause the processor to:
  for a set of digital content items received from user systems by an application system, generate and store a content graph, wherein:
    the application system is capable of distributing digital content to the user systems over a network based on a social graph and a set of spam labels; and
    the content graph comprises labeled nodes that correspond to a subset of the set of digital content items that have spam labels, unlabeled nodes that correspond to a subset of the set of digital content items that do not have spam labels, and edges between nodes of the content graph;
  query the content graph to retrieve edge data for an edge between an unlabeled node and an adjacent node, wherein:
    the unlabeled node corresponds to a digital content item that does not have a spam label;
    the adjacent node corresponds to a different digital content item; and the edge data indicates a relationship between the unlabeled node and the adjacent node; and
responsive to a set of inputs comprising the retrieved edge data and embedding data associated with the unlabeled node, by a machine learning, assign a label of the set of spam labels to the unlabeled node, wherein:
  the embedding data comprises output of a cross-modality embedding model;
  the output of the cross-modality embedding model is connected to input of the machine learning model;
  the machine learning model comprises a graph transformer-based neural network having connected modality-specific layers;
  the graph transformer-based neural network is trained to determine inter-content item relationships based on the labeled nodes and the edges of the content graph; and
  the label is assigned to the unlabeled node by the connected modality-specific layers of the trained graph transformer-based neural network performing graph-based propagation of label predictions from labeled nodes to unlabeled nodes of different modalities based on edge relationships between the nodes in the content graph.

8. The system of claim 7, wherein the instructions, when executed by the processor further cause the processor to query the content graph to retrieve modality data for the unlabeled node and different modality data for the adjacent node, and, responsive to the set of inputs including the modality data for the unlabeled node and the different modality data for the adjacent node, by the machine learning model, determine the label for the unlabeled node.

9. The system of claim 7, wherein the instructions, when executed by the processor further cause the processor to query the content graph to retrieve content type data for the unlabeled node and different content type data for the adjacent node, and, responsive to the set of inputs including the content type data and the different content type data, by the machine learning model, determine the label for the unlabeled node.

10. The system of claim 7, wherein the instructions, when executed by the processor further cause the processor to, by the cross-modality embedding model trained on digital content items of different modalities, generate a cross-modality embedding for the digital content item, and, responsive to the set of inputs including the cross-modality embedding, by the machine learning model, determine the label for the unlabeled node.

11. The system of claim 7, wherein the instructions, when executed by the processor further cause the processor to, responsive to activity data of an entity that is associated with the digital content item and represented in a social graph, by an entity activity model trained on entity activity data extracted from the application system, generate an entity activity-content item embedding, and, responsive to the set of inputs including the entity activity-content item embedding, by the machine learning model, determine the label for the unlabeled node.

12. The system of claim 7, wherein the instructions, when executed by the processor further cause the processor to machine learn the embedding data associated with the unlabeled node by an embedding layer of the machine learning model, wherein the embedding layer of the machine learning model comprises the cross-modality embedding model, and responsive to the set of inputs including the machine learned embedding data, by the machine learning model, determine the label for the unlabeled node.

13. A non-transitory machine-readable medium comprising instructions that when executed by a processor cause the processor to:

for a set of digital content items received from user systems by an application system, generate and store a content graph, wherein:

the application system is capable of distributing digital content to the user systems over a network based on a social graph and a set of spam labels; and the content graph comprises labeled nodes that correspond to a subset of the set of digital content items that have spam labels, unlabeled nodes that correspond to a subset of the set of digital content items that do not have spam labels, and edges between nodes of the content graph;

query the content graph to retrieve edge data for an edge between an unlabeled node and an adjacent node, wherein:

the unlabeled node corresponds to a digital content item that does not have a spam label;

the adjacent node corresponds to a different digital content item; and the edge data indicates a relationship between the unlabeled node and the adjacent node; and responsive to a set of inputs comprising the retrieved edge data and embedding data associated with the unlabeled node, by a machine learning, assign a label of the set of spam labels to the unlabeled node, wherein:

the embedding data comprises output of a cross-modality embedding model;

the output of the cross-modality embedding model is connected to input of the machine learning model;

the machine learning model comprises a graph transformer-based neural network having connected modality-specific layers;

the graph transformer-based neural network is trained to determine inter-content item relationships based on the labeled nodes and the edges of the content graph; and the label is assigned to the unlabeled node by the connected modality-specific layers of the trained graph transformer-based neural network performing graph-based propagation of label predictions from labeled nodes to unlabeled nodes of different modalities based on edge relationships between the nodes in the content graph.

14. The non-transitory machine-readable medium of claim 13, wherein the instructions, when executed by the processor further cause the processor to query the content graph to retrieve modality data for the unlabeled node and different modality data for the adjacent node, and, responsive to the set of inputs including the modality data for the unlabeled node and the different modality data for the adjacent node, by the machine learning model, determine the label for the unlabeled node.

15. The non-transitory machine-readable medium of claim 13, wherein the instructions, when executed by the processor further cause the processor to query the content graph to retrieve content type data for the unlabeled node and different content type data for the adjacent node, and, responsive to the set of inputs including the content type data and the different content type data, by the machine learning model, determine the label for the unlabeled node.

16. The non-transitory machine-readable medium of claim 13, wherein the instructions, when executed by the processor further cause the processor to, by the cross-modality embedding model trained on digital content items of different modalities, generate a cross-modality embedding for the digital content item, and, responsive to the set of inputs including the cross-modality embedding, by the machine learning model, determine the label for the unlabeled node.

17. The non-transitory machine-readable medium of claim 13, wherein the instructions, when executed by the processor further cause the processor to, responsive to activity data of an entity that is associated with the digital content item and represented in a social graph, by an entity activity model trained on entity activity data extracted from the application system, generate an entity activity-content item embedding, and, responsive to the set of inputs including the entity activity-content item embedding, by the machine learning model, determine the label for the unlabeled node.

18. The non-transitory machine-readable medium of claim 13, wherein the instructions, when executed by the processor further cause the processor to machine learn the embedding data associated with the unlabeled node by an embedding layer of the machine learning model, wherein the embedding layer of the machine learning model comprises the cross-modality embedding model, and responsive to the set of inputs including the machine learned embedding data, by the machine learning model, determine the label for the unlabeled node.

19. The non-transitory machine-readable medium of claim 13, wherein the labeled node corresponds to content that is a first type of a post, an article, a comment, or a reply, and the unlabeled node corresponds to a second type that is different from the first type.

20. The non-transitory machine-readable medium of claim 13, wherein the labeled node corresponds to content having a first modality of a text, image, video, or audio; and the unlabeled node corresponds to a second modality that is different from the first modality.

* * * * *